US011531352B2

(12) United States Patent
Thode et al.

(10) Patent No.: US 11,531,352 B2
(45) Date of Patent: Dec. 20, 2022

(54) SYSTEMS AND METHODS FOR VEHICLE POSITION CALIBRATION USING RACK LEG IDENTIFICATION AND MAST SWAY COMPENSATION

(71) Applicant: Crown Equipment Corporation, New Bremen, OH (US)

(72) Inventors: Justin Forbes Thode, Auckland (NZ); Grace Da-In Lee, Christchurch (NZ)

(73) Assignee: Crown Equipment Corporation, New Bremen, OH (US)

( * ) Notice: Subject to any disclaimer, the term of this patent is extended or adjusted under 35 U.S.C. 154(b) by 416 days.

(21) Appl. No.: 16/781,514

(22) Filed: Feb. 4, 2020

(65) Prior Publication Data
US 2020/0247612 A1    Aug. 6, 2020

Related U.S. Application Data

(60) Provisional application No. 62/801,897, filed on Feb. 6, 2019, provisional application No. 62/801,904, filed (Continued)

(51) Int. Cl.
*G06F 7/00* (2006.01)
*G05D 1/02* (2020.01)
(Continued)

(52) U.S. Cl.
CPC ............ *G05D 1/0253* (2013.01); *B60R 11/04* (2013.01); *B65G 1/0492* (2013.01); *B66F 9/063* (2013.01);
(Continued)

(58) Field of Classification Search
CPC ............... G05D 1/0253; G05D 1/0212; G05D 2201/0216; G05D 1/0272; G05D 1/0246;
(Continued)

(56) References Cited

U.S. PATENT DOCUMENTS

| 4,957,408 A | 9/1990 | Ohkura |
| 8,425,173 B2 | 4/2013 | Lert et al. |
(Continued)

FOREIGN PATENT DOCUMENTS

| DE | 19925131 A1 | 12/2000 |
| EP | 0508793 A2 | 10/1992 |
(Continued)

OTHER PUBLICATIONS

International Search Report and Written Opinion dated Jul. 28, 2020 pertaining to International Application No. PCT/US2020/016566 filed Feb. 4, 2020 (14 pgs.).

(Continued)

*Primary Examiner* — Yolanda R Cum Bess
(74) *Attorney, Agent, or Firm* — Dinsmore & Shohl LLP

(57) ABSTRACT

A materials handling vehicle includes a camera, odometry module, processor, and drive mechanism. The camera captures images of an identifier for a racking system aisle and a rack leg portion in the aisle. The processor uses the identifier to generate information indicative of an initial rack leg position and rack leg spacing in the aisle, generate an initial vehicle position using the initial rack leg position, generate a vehicle odometry-based position using odometry data and the initial vehicle position, detect a subsequent rack leg using a captured image, correlate the detected subsequent rack leg with an expected vehicle position using rack leg spacing, generate an odometry error signal based on a difference between the positions, and update the vehicle odometry-based position using the odometry error signal and/or generated mast sway compensation to use for end of aisle protection and/or in/out of aisle localization.

20 Claims, 18 Drawing Sheets

Related U.S. Application Data on Feb. 6, 2019, provisional application No. 62/801,893, filed on Feb. 6, 2019.

(51) Int. Cl.
| | |
|---|---|
| *G06T 7/70* | (2017.01) |
| *B60R 11/04* | (2006.01) |
| *B66F 9/075* | (2006.01) |
| *B65G 1/04* | (2006.01) |
| *B66F 9/06* | (2006.01) |
| *B66F 9/20* | (2006.01) |
| *G06V 20/56* | (2022.01) |

(52) U.S. Cl.
CPC .............. *B66F 9/0755* (2013.01); *B66F 9/20* (2013.01); *G05D 1/0212* (2013.01); *G06T 7/70* (2017.01); *G06V 20/56* (2022.01); *G05D 2201/0216* (2013.01); *G06T 2207/30252* (2013.01)

(58) Field of Classification Search
CPC ....... B60R 11/04; B65G 1/0492; B66F 9/063; B66F 9/0755; B66F 9/20; G06T 7/70; G06T 2207/30252; G06V 20/56; G01C 21/206
USPC ...................................... 701/50; 700/213–214
See application file for complete search history.

(56) References Cited

U.S. PATENT DOCUMENTS

| | | | |
|---|---|---|---|
| 8,508,590 B2 | 8/2013 | Laws et al. | |
| 8,538,577 B2 | 9/2013 | Bell et al. | |
| 8,548,671 B2 | 10/2013 | Wong et al. | |
| 8,589,012 B2 | 11/2013 | Wong et al. | |
| 8,594,923 B2 | 11/2013 | Wong et al. | |
| 9,170,581 B2 | 10/2015 | Al. | |
| 9,174,830 B1 | 11/2015 | Bell | |
| 9,188,982 B2 | 11/2015 | Thomson | |
| 9,349,181 B2 | 5/2016 | Chandrasekar et al. | |
| 9,354,070 B2 | 5/2016 | Thomson et al. | |
| 9,488,984 B1 | 11/2016 | Williams et al. | |
| 9,580,285 B2 | 2/2017 | Wong et al. | |
| 9,776,794 B2 | 10/2017 | Sullivan et al. | |
| 9,811,088 B2 | 11/2017 | Walton et al. | |
| 9,880,009 B2 | 1/2018 | Bell | |
| 9,881,379 B2 | 1/2018 | Limura | |
| 9,908,702 B2 | 3/2018 | Elazary et al. | |
| 9,921,067 B2 | 3/2018 | Fanselow et al. | |
| 9,984,467 B2 | 5/2018 | Chandrasekar et al. | |
| 10,429,188 B2 | 10/2019 | Robinson et al. | |
| 10,450,001 B2 | 10/2019 | Stewart et al. | |
| 10,455,226 B2 | 10/2019 | Thomson et al. | |
| 10,671,087 B2 | 6/2020 | Collett et al. | |
| 10,775,805 B2 | 9/2020 | Kaylor et al. | |
| 2007/0112461 A1* | 5/2007 | Zini | G05D 1/0242 700/245 |
| 2008/0202856 A1 | 8/2008 | Fossier et al. | |
| 2013/0173435 A1 | 7/2013 | Cozad, Jr. | |
| 2014/0198206 A1 | 7/2014 | Murray | |
| 2016/0189366 A1 | 8/2016 | Chamberlain et al. | |
| 2017/0270579 A1 | 9/2017 | Ridao Carlini et al. | |
| 2018/0022549 A1 | 1/2018 | Sullivan et al. | |
| 2018/0057329 A1 | 3/2018 | Poschl et al. | |
| 2018/0088586 A1 | 3/2018 | Hance et al. | |
| 2018/0143638 A1 | 5/2018 | Walton et al. | |
| 2019/0265722 A1 | 8/2019 | Haeusler et al. | |
| 2020/0026304 A1* | 1/2020 | Thode | G05D 1/0242 |
| 2020/0039353 A1 | 2/2020 | Chandrasekar | |
| 2020/0247613 A1 | 8/2020 | Thode et al. | |
| 2020/0249692 A1 | 8/2020 | Thode et al. | |
| 2020/0264625 A1 | 8/2020 | Estep et al. | |

FOREIGN PATENT DOCUMENTS

| | | | |
|---|---|---|---|
| EP | 1408001 A1 | 4/2004 | |
| EP | 2863284 A2 | 4/2015 | |
| WO | 9835276 A1 | 8/1998 | |
| WO | 2016179532 A1 | 11/2016 | |
| WO | 2017022048 A1 | 9/2017 | |

OTHER PUBLICATIONS

International Search Report and Written Opinion relating to International Application No. PCT/US2019/042127 dated Nov. 12, 2019.
International Search Report and Written Opinion issued by the European Patent Office acting as International Search Authority for International Application No. PCT/US2020/016580 dated Jun. 16, 2020 (13 pages).
International Search Report and Written Opinion relating to International Application No. CT/US2020/016567 dated May 26, 2020.

* cited by examiner

SYSTEMS AND METHODS FOR VEHICLE POSITION CALIBRATION USING RACK LEG IDENTIFICATION AND MAST SWAY COMPENSATION

CROSS-REFERENCE TO RELATED APPLICATIONS

This application claims the benefit of U.S. Provisional Application Ser. No. 62/801,893 (CRNZ 1830 MA), entitled "SYSTEMS AND METHODS FOR VEHICLE POSITION CALIBRATION USING RACK LEG IDENTIFICATION AND MAST SWAY COMPENSATION," filed Feb. 6, 2019; U.S. Provisional Application Ser. No. 62/801,897 (CRNZ 1831 MA), entitled "SYSTEMS AND METHODS FOR END OF AISLE PROTECTION AND VEHICLE POSITION CALIBRATION USING RACK LEG IDENTIFICATION," filed Feb. 6, 2019; and U.S. Provisional Application Ser. No. 62/801,904 (CRNZ 1832 MA), entitled "SYSTEMS AND METHODS FOR OUT OF AISLE LOCALIZATION AND VEHICLE POSITION CALIBRATION USING RACK LEG IDENTIFICATION," filed Feb. 6, 2019, the entireties of which are incorporated by referenced herein.

TECHNICAL FIELD

The present specification generally relates to systems and methods for providing and updating localization for industrial vehicles based on a racking system in a warehouse environment and, more specifically, to systems and methods for utilization of a rack leg imaging module on an industrial vehicle and upright rack leg rails of the racking system to track and update the location of the industrial vehicle in an aisle of the warehouse based on a rack leg identification associated with the aisle.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle that navigates through the industrial environment or a manually guided vehicle that knows its location within the industrial environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle.

BRIEF SUMMARY

According to the subject matter of the present disclosure, in a first aspect, a materials handling vehicle comprises a camera, a mast assembly, a mast assembly control unit, a fork carriage assembly, a vehicle position processor, and a drive mechanism configured to move the materials handling vehicle along an inventory transit surface of a warehouse, and the mast assembly and the mast assembly control unit are configured to move the fork carriage assembly along a vertical lift axis. The camera is secured to the fork carriage assembly and is configured to capture (i) a forks down image of at least a portion of a rack leg positioned in a racking system aisle of the multilevel warehouse racking system, and (ii) a forks-up image of at least a portion of a rack leg positioned in a racking system aisle of the multilevel warehouse racking system. The vehicle position processor is configured to generate a forks-down coordinate X1 of the camera along a horizontal axis from the forks-down image of the rack leg, generate a forks-up coordinate X2 of the camera along a horizontal axis from a forks-up image of the rack leg captured with the fork carriage assembly at a lift height H1, determine a mast sway offset as a difference between the forks-down coordinate X1 and the forks-up coordinate X2, and determine a horizontally advanced position of the materials handling vehicle with the fork carriage assembly at the lift height H1 using the mast sway offset and a subsequently captured forks-up image of at least a portion of a rack leg positioned in the racking system aisle.

In a second aspect, comprising the materials handling vehicle of the first aspect, the camera is further configured to capture an image of an aisle entry identifier in a multilevel warehouse racking system, and the vehicle position processor is further configured to generate aisle-specific rack leg spacing data from an image of an aisle entry identifier, as captured by the camera, and determine the horizontally advanced position of the materials handling vehicle with the fork carriage assembly at the lift height H1 using the aisle-specific rack leg spacing data in addition to the mast sway offset and the subsequently captured forks-up image.

In a third aspect, comprising the materials handling vehicle of first aspect or the second aspect, the camera is further configured to capture an image of an aisle entry identifier in a multilevel warehouse racking system, and the vehicle position processor is further configured to generate end-of-aisle positional data and aisle-specific rack leg spacing data from an image of an aisle entry identifier, as captured by the camera, and generate an initial position of the materials handling vehicle along the inventory transit surface using the end-of-aisle positional data. The vehicle position processor is further configured to generate an expected position of the materials handling vehicle as the vehicle travels down a racking system aisle corresponding to the aisle entry identifier from the end-of-aisle positional data, the aisle-specific rack leg spacing data, and a forks-down image of at least a portion of a rack leg positioned in the racking system aisle, and update the expected position of the materials handling vehicle as the vehicle travels down the racking system aisle using the mast sway offset and the subsequently captured forks-up image of at least a portion of a rack leg positioned in the racking system aisle.

In a fourth aspect, comprising the materials handling vehicle of the third aspect, the aisle entry identifier is disposed on an end rack leg of the racking system aisle.

In a fifth aspect, comprising the materials handling vehicle of any of the first aspect to the fourth aspect, the camera is secured directly or indirectly to the fork carriage assembly.

In a sixth aspect, comprising the materials handling vehicle of any of the first aspect to the fifth aspect, the camera is further configured to capture an image of an aisle end identifier in a multilevel warehouse racking system, and the vehicle position processor is further configured to generate end-of-aisle limit data comprising an end-of-aisle limit from an image of an aisle end identifier, as captured by the camera, determine whether the materials handling vehicle exceeds the end-of-aisle limit, transmit a limit-based command to the drive mechanism of the materials handling vehicle when an operating state of the materials handling vehicle exceeds the end-of-aisle limit, initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

In a seventh aspect, comprising the materials handling vehicle of the sixth aspect, the aisle end identifier is disposed on an aisle end rack leg.

In an eighth aspect, comprising the materials handling vehicle of the sixth aspect, the end-of-aisle limit comprises a speed limit, a lift height limit, an acceleration limit, a deceleration limit, a lift acceleration limit, a lift deceleration limit, or combinations thereof.

In a ninth aspect, comprising the materials handling vehicle of the sixth aspect, the vehicle position processor is configured to navigate the materials handling vehicle outside of the racking system aisle in the modified operating state, in an additional operating state that is within or outside of the end-of-aisle limit, or in a combination of operating states selected therefrom.

In a tenth aspect, comprising the materials handling vehicle of any of the first aspect to the ninth aspect, the camera is further configured to capture an image of an aisle entry identifier in a multilevel warehouse racking system, and the vehicle position processor is further configured to generate end-of-aisle limit data comprising an end-of-aisle limit, end-of-aisle positional data, and aisle-specific rack leg spacing data from an image of an aisle entry identifier, as captured by the camera, generate an initial position of the materials handling vehicle along the inventory transit surface using the end-of-aisle positional data, and generate an expected position of the materials handling vehicle as the vehicle travels down a racking system aisle corresponding to the aisle entry identifier from the end-of-aisle positional data, the aisle-specific rack leg spacing data, and the horizontally advanced position. The vehicle position processor is further configured to determine whether the operating state of the materials handling vehicle exceeds the end-of-aisle limit when the expected position of the materials handling vehicle corresponds to an end of the racking system aisle, transmit a limit-based command to the drive mechanism of the materials handling vehicle when the operating state of the materials handling vehicle exceeds the end-of-aisle limit, initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

In an eleventh aspect, comprising the materials handling vehicle of the tenth aspect, the vehicle position processor is further configured to generate the expected position of the materials handling vehicle from an image of at least a portion of a rack leg positioned in the racking system aisle.

In a twelfth aspect, comprising the materials handling vehicle of any of the first aspect to the eleventh aspect, the camera is configured to capture images comprising an aisle entry identifier for a racking system aisle of a multilevel warehouse racking system, and the vehicle position processor is configured to generate end-of-aisle positional data and aisle-specific rack leg spacing data from an image of an aisle entry identifier, as captured by the camera, generate an initial position of the materials handling vehicle along the inventory transit surface using the end-of-aisle positional data, and generate an expected position of the materials handling vehicle as the vehicle travels down a racking system aisle corresponding to the aisle entry identifier from the end-of-aisle positional data, the aisle-specific rack leg spacing data, and the horizontally advanced position. The vehicle position processor is further configured to navigate the materials handling vehicle to exit the racking system aisle, and update the expected position of the materials handling vehicle using a dead reckoning component of the materials handling vehicle when the materials handling vehicle is outside of the racking system aisle.

In a thirteenth aspect, comprising the materials handling vehicle of any of the first aspect to the twelfth aspect, the camera is configured to capture images comprising an aisle exit identifier for a racking system aisle of a multilevel warehouse racking system, and the vehicle position processor is configured to generate end-of-aisle positional data from an image of an aisle exit identifier, as captured by the camera, generate a vehicle pose of the materials handling vehicle relative to the aisle exit identifier using the end-of-aisle positional data, and generate an inventory transit surface position of the materials handling vehicle along the inventory transit surface using the end-of-aisle positional data, the vehicle pose, and the horizontally advanced position. The vehicle position processor is further configured to navigate the materials handling vehicle to exit the racking system aisle, and update the inventory transit surface position of the materials handling vehicle using a tag identifier component of the materials handling vehicle when the materials handling vehicle is outside of the racking system aisle.

In a fourteenth aspect, comprising the materials handling vehicle of the thirteenth aspect, the vehicle position processor is configured to generate out-of-aisle positional data from a tag identifier, as received by the tag identifier component, and update the vehicle pose of the materials handling vehicle relative to the tag identifier using the out-of-aisle positional data.

According to an embodiment, in a fifteenth aspect, a method of localizing a materials handling vehicle is recited, the vehicle comprising a camera, a mast assembly, a mast assembly control unit, a fork carriage assembly, a vehicle position processor, and a drive mechanism configured to move the materials handling vehicle along an inventory transit surface of a warehouse, wherein the mast assembly and the mast assembly control unit are configured to move the fork carriage assembly along a vertical lift axis. The mast assembly and the mast assembly control unit are configured to move the fork carriage assembly along a vertical lift axis, and the camera is secured to the fork carriage assembly and is configured to capture (i) a forks down image of at least a portion of a rack leg positioned in a racking system aisle of the multilevel warehouse racking system, and (ii) a forks-up image of at least a portion of a rack leg positioned in a racking system aisle of the multilevel warehouse racking system. The method comprises, via the vehicle position processor, generating a forks-down coordinate $X1$ of the camera along a horizontal axis from the forks-down image of the rack leg, generating a forks-up coordinate $X2$ of the camera along a horizontal axis from a forks-up image of the rack leg captured with the fork carriage assembly at a lift height $H1$, determining a mast sway offset as a difference between the forks-down coordinate $X1$ and the forks-up coordinate $X2$, and determining a horizontally advanced position of the materials handling vehicle with the fork carriage assembly at the lift height $H1$ using the mast sway offset and a subsequently captured forks-up image of at least a portion of a rack leg positioned in the racking system aisle.

In a sixteenth aspect, comprising the method of the fifteenth aspect, the camera is further configured to capture an image of an aisle end identifier in a multilevel warehouse racking system. The method further comprises generating end-of-aisle limit data comprising an end-of-aisle limit from an image of an aisle end identifier, as captured by the camera, determining whether the materials handling vehicle exceeds the end-of-aisle limit, transmitting a limit-based command to the drive mechanism of the materials handling vehicle when an operating state of the materials handling vehicle exceeds the end-of-aisle limit, initiating a vehicle action based on the limit-based command, the vehicle action configured to modify operation of the materials handling vehicle to a modified operating state within the end-of-aisle limit, and navigating the materials handling vehicle to exit the racking system aisle in the modified operating state.

In a seventeenth aspect, comprising the method of the fifteenth aspect, the camera is further configured to capture an image of an aisle entry identifier in a multilevel warehouse racking system, and the method further comprises generating end-of-aisle limit data comprising an end-of-aisle limit, end-of-aisle positional data, and aisle-specific rack leg spacing data from an image of an aisle entry identifier, as captured by the camera, generating an initial position of the materials handling vehicle along the inventory transit surface using the end-of-aisle positional data, and generating an expected position of the materials handling vehicle as the vehicle travels down a racking system aisle corresponding to the aisle entry identifier from the end-of-aisle positional data, the aisle-specific rack leg spacing data, and the horizontally advanced position. The method further comprises determining whether the operating state of the materials handling vehicle exceeds the end-of-aisle limit when the expected position of the materials handling vehicle corresponds to an end of the racking system aisle, transmitting a limit-based command to the drive mechanism of the materials handling vehicle when the operating state of the materials handling vehicle exceeds the end-of-aisle limit, initiating a vehicle action based on the limit-based command, the vehicle action configured to modify operation of the materials handling vehicle to a modified operating state within the end-of-aisle limit, and navigating the materials handling vehicle to exit the racking system aisle in the modified operating state.

In an eighteenth aspect, comprising any of the methods of the fifteenth aspect to the seventeenth aspect, the camera is configured to capture images comprising an aisle entry identifier for a racking system aisle of a multilevel warehouse racking system, and the method further comprises generating end-of-aisle positional data and aisle-specific rack leg spacing data from an image of an aisle entry identifier, as captured by the camera, generating an initial position of the materials handling vehicle along the inventory transit surface using the end-of-aisle positional data, generating an expected position of the materials handling vehicle as the vehicle travels down a racking system aisle corresponding to the aisle entry identifier from the end-of-aisle positional data, the aisle-specific rack leg spacing data, and the horizontally advanced position, navigating the materials handling vehicle to exit the racking system aisle, and updating the expected position of the materials handling vehicle using a dead reckoning component of the materials handling vehicle when the materials handling vehicle is outside of the racking system aisle.

In a nineteenth aspect, comprising the method of any of the fifteenth aspect to the eighteenth aspect, the camera is configured to capture images comprising an aisle exit identifier for a racking system aisle of a multilevel warehouse racking system, and the method further comprises generating end-of-aisle positional data from an image of an aisle exit identifier, as captured by the camera, generating a vehicle pose of the materials handling vehicle relative to the aisle exit identifier using the end-of-aisle positional data, generating an inventory transit surface position of the materials handling vehicle along the inventory transit surface using the end-of-aisle positional data, the vehicle pose, and the horizontally advanced position, navigating the materials handing vehicle to exit the racking system aisle, and updating the inventory transit surface position of the materials handling vehicle using a tag identifier component of the materials handling vehicle when the materials handling vehicle is outside of the racking system aisle.

In a twentieth aspect, comprising the method of the nineteenth aspect, the method further comprises generating out-of-aisle positional data from a tag identifier, as received by the tag identifier component, and updating the vehicle pose of the materials handling vehicle relative to the tag identifier using the out-of-aisle positional data.

In another embodiment, according to a twenty-first aspect, a materials handling vehicle comprises a camera, a vehicle position processor, and a drive mechanism configured to move the materials handling vehicle along an inventory transit surface. The camera is configured to capture an image comprising an aisle end identifier for a racking system aisle of a multilevel warehouse racking system, and the vehicle position processor is configured to generate end-of-aisle limit data comprising an end-of-aisle limit from an image of an aisle end identifier, as captured by the camera, determine whether the materials handling vehicle exceeds the end-of-aisle limit, transmit a limit-based command to the drive mechanism of the materials handling vehicle when an operating state of the materials handling vehicle exceeds the end-of-aisle limit, initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

In a twenty-second aspect, comprising the materials handling vehicle of the twenty-first aspect, the end-of-aisle limit comprises a speed limit, a lift height limit, an acceleration limit, a deceleration limit, a lift acceleration limit, a lift deceleration limit, or combinations thereof.

In a twenty-third aspect, comprising the materials handling vehicle of the twenty-first aspect or the twenty-second aspect, the vehicle position processor is configured to navigate the materials handling vehicle outside of the racking system aisle in the modified operating state, in an additional operating state that is within or outside of the end-of-aisle limit, or in a combination of operating states selected therefrom.

In a twenty-fourth aspect, comprising the materials handling vehicle of any of the twenty-first aspect to the twenty-third aspect, the aisle end identifier is disposed on an aisle end rack leg.

In a twenty-fifth aspect, comprising the materials handling vehicle of any of the twenty-first aspect to the twenty-fourth aspect, the aisle end identifier is disposed on an end rack leg of the racking system aisle.

In a twenty-sixth aspect, comprising the materials handling vehicle of any of the twenty-first aspect to the twenty-fifth aspect, the camera is configured to capture images comprising an aisle entry identifier for a racking system aisle of a multilevel warehouse racking system, and the vehicle position processor is configured to generate end-of-aisle positional data and aisle-specific rack leg spacing data from an image of an aisle entry identifier, as captured by the camera, generate an initial position of the materials handling vehicle along the inventory transit surface using the end-of-aisle positional data, generate an expected position of the materials handling vehicle as the vehicle travels down the racking system aisle corresponding to the aisle entry identifier from the end-of-aisle positional data and the aisle-specific rack leg spacing data, and determine whether the operating state of the materials handling vehicle exceeds the end-of-aisle limit when the expected position of the materials handling vehicle corresponds to an end of the racking system aisle.

In a twenty-seventh aspect, comprising the materials handling vehicle of the twenty-sixth aspect, the vehicle position processor is further configured to generate the expected position of the materials handling vehicle from an image of at least a portion of a rack leg positioned in the racking system aisle.

In a twenty-eighth aspect, comprising the materials handling vehicle of any of the twenty-first aspect to the twenty-seventh aspect, the materials handling vehicle further comprises a mast assembly, a mast assembly control unit, and a fork carriage assembly, the mast assembly and the mast assembly control unit are configured to move the fork carriage assembly along a vertical lift axis, and the camera is secured to the fork carriage assembly and is configured to capture (i) a forks down image of at least a portion of a rack leg positioned in a racking system aisle of the multilevel warehouse racking system, and (ii) a forks-up image of at least a portion of a rack leg positioned in a racking system aisle of the multilevel warehouse racking system. The vehicle position processor is configured to generate a forks-down coordinate X1 of the camera along a horizontal axis from the forks-down image of the rack leg, generate a forks-up coordinate X2 of the camera along a horizontal axis from a forks-up image of the rack leg captured with the fork carriage assembly at a lift height H1, determine a mast sway offset as a difference between the forks-down coordinate X1 and the forks-up coordinate X2, and determine a horizontally advanced position of the materials handling vehicle with the fork carriage assembly at the lift height H1 using the mast sway offset and a subsequently captured forks-up image of at least a portion of a rack leg positioned in the racking system aisle.

In a twenty-ninth aspect, comprising the materials handling vehicle of any of the twenty-first aspect to the twenty-eighth aspect, the camera is configured to capture images comprising an aisle entry identifier for a racking system aisle of a multilevel warehouse racking system, and the vehicle position processor is configured to generate end-of-aisle positional data and aisle-specific rack leg spacing data from an image of an aisle entry identifier, as captured by the camera, generate an initial position of the materials handling vehicle along the inventory transit surface using the end-of-aisle positional data, and generate an expected position of the materials handling vehicle as the vehicle travels down a racking system aisle corresponding to the aisle entry identifier from the end-of-aisle positional data and the aisle-specific rack leg spacing data. The vehicle position processor is further configured to navigate the materials handling vehicle to exit the racking system aisle, and update the expected position of the materials handling vehicle using a dead reckoning component of the materials handling vehicle when the materials handling vehicle is outside of the racking system aisle.

In a thirtieth aspect, comprising the materials handling vehicle of any of the twenty-first aspect to the twenty-ninth aspect, the camera is configured to capture images comprising an aisle exit identifier for a racking system aisle of a multilevel warehouse racking system, and the the vehicle position processor is configured to generate end-of-aisle positional data from an image of an aisle exit identifier, as captured by the camera, generate a vehicle pose of the materials handling vehicle relative to the aisle exit identifier using the end-of-aisle positional data, generate an inventory transit surface position of the materials handling vehicle along the inventory transit surface using the end-of-aisle positional data and the vehicle pose, and navigate the materials handing vehicle to exit the racking system aisle, and update the inventory transit surface position of the materials handling vehicle using a tag identifier component of the materials handling vehicle when the materials handling vehicle is outside of the racking system aisle.

In a thirty-first aspect, comprising the materials handling vehicle of the thirtieth aspect, the vehicle position processor is configured to generate out-of-aisle positional data from a tag identifier, as received by the tag identifier component, and update the vehicle pose of the materials handling vehicle relative to the tag identifier using the out-of-aisle positional data.

According to another embodiment, in a thirty-second aspect, a materials handling vehicle comprising a camera, a vehicle position processor, and a drive mechanism configured to move the materials handling vehicle along an inventory transit surface, wherein the camera is configured to capture an image comprising an aisle entry identifier for a racking system aisle of a multilevel warehouse racking system. The vehicle position processor is configured to generate end-of-aisle limit data comprising an end-of-aisle limit, end-of-aisle positional data, and aisle-specific rack leg spacing data from an image of an aisle entry identifier, as captured by the camera, generate an initial position of the materials handling vehicle along the inventory transit surface using the end-of-aisle positional data, and generate an expected position of the materials handling vehicle as the vehicle travels down a racking system aisle corresponding to the aisle entry identifier from the end-of-aisle positional data and the aisle-specific rack leg spacing data. The vehicle position processor is further configured to determine whether the operating state of the materials handling vehicle exceeds the end-of-aisle limit when the expected position of the materials handling vehicle corresponds to an end of the racking system aisle, transmit a limit-based command to the drive mechanism of the materials handling vehicle when the operating state of the materials handling vehicle exceeds the end-of-aisle limit, initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

In a thirty-third aspect, comprising the materials handling vehicle of the thirty-second aspect, the vehicle position processor is further configured to generate the expected position of the materials handling vehicle from an image of at least a portion of a rack leg positioned in the racking system aisle.

In a thirty-fourth aspect, comprising the materials handling vehicle of the thirty-second aspect or the thirty-third aspect, the aisle entry identifier is disposed on an end rack leg of the racking system aisle.

In a thirty-fifth aspect, comprising the materials handling vehicle of any of the thirty-second aspect to the thirty-fourth aspect, the materials handling vehicle further comprises a mast assembly, a mast assembly control unit, and a fork carriage assembly, the mast assembly and the mast assembly control unit are configured to move the fork carriage assembly along a vertical lift axis, and the fork is secured to the fork carriage assembly and is configured to capture (i) a forks down image of at least a portion of a rack leg positioned in the racking system aisle of the multilevel warehouse racking system, and (ii) a forks-up image of at least a portion of a rack leg positioned in the racking system aisle of the multilevel warehouse racking system. The vehicle position processor is configured to generate a forks-down coordinate X1 of the camera along a horizontal axis from the forks-down image of the rack leg, generate a forks-up coordinate X2 of the camera along a horizontal axis from a forks-up image of the rack leg captured with the fork carriage assembly at a lift height H1, determine a mast sway offset as a difference between the forks-down coordinate X1 and the forks-up coordinate X2, determine a horizontally advanced position of the materials handling vehicle with the fork carriage assembly at the lift height H1 using aisle-specific rack leg spacing data in addition to the mast sway offset and a subsequently captured forks-up image of at least a portion of a rack leg positioned in the racking system aisle, and update the expected position using the horizontally advanced position.

In a thirty-sixth aspect, comprising the materials handling vehicle of any of the thirty-second aspect to the thirty-fifth aspect, the vehicle position processor is configured to update the expected position of the materials handling vehicle using a dead reckoning component of the materials handling vehicle when the materials handling vehicle is outside of the racking system aisle.

In a thirty-seventh aspect, comprising the materials handling vehicle of any of the thirty-second aspect to the thirty-sixth aspect, the camera is configured to capture images comprising an aisle exit identifier for a racking system aisle of a multilevel warehouse racking system, and the vehicle position processor is configured to generate end-of-aisle positional data from an image of an aisle exit identifier, as captured by the camera, generate a vehicle pose of the materials handling vehicle relative to the aisle exit identifier using the end-of-aisle positional data, generate an inventory transit surface position of the materials handling vehicle along the inventory transit surface using the end-of-aisle positional data, the vehicle pose, and the expected position, navigate the materials handing vehicle to exit the racking system aisle, and update the inventory transit surface position of the materials handling vehicle using a tag identifier component of the materials handling vehicle when the materials handling vehicle is outside of the racking system aisle.

In a thirty-eighth aspect, comprising the materials handling vehicle of the thirty-seventh aspect, the vehicle position processor is configured to generate out-of-aisle positional data from a tag identifier, as received by the tag identifier component, and update the vehicle pose of the materials handling vehicle relative to the tag identifier using the out-of-aisle positional data.

In yet another embodiment, in a thirty-ninth aspect, a materials handling vehicle comprises a camera, a vehicle position processor, and a drive mechanism configured to move the materials handling vehicle along an inventory transit surface, and the camera is configured to capture images comprising (i) an aisle entry identifier for a racking system aisle of a multilevel warehouse racking system, and (ii) at least a portion of a rack leg positioned in the racking system aisle. The vehicle position processor is configured to generate end-of-aisle positional data and aisle-specific rack leg spacing data from an image of an aisle entry identifier, as captured by the camera, generate an initial position of the materials handling vehicle along the inventory transit surface using the end-of-aisle positional data, generate an expected position of the materials handling vehicle as the vehicle travels down a racking system aisle corresponding to the aisle entry identifier from the end-of-aisle positional data and the aisle-specific rack leg spacing data, navigate the materials handling vehicle to exit the racking system aisle, and update the expected position of the materials handling vehicle using a dead reckoning component of the materials handling vehicle when the materials handling vehicle is outside of the racking system aisle.

In a fortieth aspect, comprising the materials handling vehicle of the thirty-ninth aspect, the camera is configured to capture images comprising an aisle exit identifier for a racking system aisle of a multilevel warehouse racking system, and the vehicle position processor is configured to generate end-of-aisle positional data from an image of an aisle exit identifier, as captured by the camera, generate a vehicle pose of the materials handling vehicle relative to the aisle exit identifier using the end-of-aisle positional data, generate an inventory transit surface position of the materials handling vehicle along the inventory transit surface using the end-of-aisle positional data, the vehicle pose, and the expected position, navigate the materials handing vehicle to exit the racking system aisle, and update the inventory transit surface position of the materials handling vehicle using a tag identifier component of the materials handling vehicle when the materials handling vehicle is outside of the racking system aisle.

In a forty-first aspect, comprising the materials handling vehicle of the fortieth aspect, the vehicle position processor is configured to generate out-of-aisle positional data from a tag identifier, as received by the tag identifier component, and update the vehicle pose of the materials handling vehicle relative to the tag identifier using the out-of-aisle positional data.

In a forty-second aspect, comprising the materials handling vehicle of any of the thirty-ninth aspect to the forty-first aspect, the materials handling vehicle further comprises a mast assembly, a mast assembly control unit, and a fork carriage assembly, the mast assembly and the mast assembly control unit are configured to move the fork carriage assembly along a vertical lift axis, and the camera is secured to the fork carriage assembly and is configured to capture (i) a forks down image of at least a portion of a rack leg positioned in a racking system aisle of the multilevel warehouse racking system, and (ii) a forks-up image of at least a portion of a rack leg positioned in a racking system aisle of the multilevel warehouse racking system. The vehicle position processor is configured to generate a forks-down coordinate X1 of the camera along a horizontal axis from the forks-down image of the rack leg, generate a forks-up coordinate X2 of the camera along a horizontal axis from a forks-up image of the rack leg captured with the fork carriage assembly at a lift height H1, and determine a mast sway offset as a difference between the forks-down coordinate X1 and the forks-up coordinate X2. The vehicle position processor is further configured to determine a horizontally advanced position of the materials handling vehicle with the fork carriage assembly at the lift height H1 using the mast sway offset and a subsequently captured forks-up image of at least a portion of a rack leg positioned in the racking system aisle, and update the expected position using the horizontally advanced position.

In a forty-third aspect, comprising the materials handling vehicle of any of the thirty-ninth aspect to the forty-second aspect, the vehicle position processor is configured to generate end-of-aisle limit data comprising an end-of-aisle limit from the image of the aisle entry identifier, as captured by the camera, determine whether the materials handling vehicle exceeds the end-of-aisle limit, and transmit a limit-based command to the drive mechanism of the materials handling vehicle when an operating state of the materials handling vehicle exceeds the end-of-aisle limit. The vehicle position processor is further configured to initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

In a forty-fourth aspect, comprising the materials handling vehicle of the forty-third aspect, the end-of-aisle limit comprises a speed limit, a lift height limit, an acceleration limit, a deceleration limit, a lift acceleration limit, a lift deceleration limit, or combinations thereof.

In a forty-fifth aspect, comprising the materials handling vehicle of the forty-third aspect or the forty-fourth aspect, the vehicle position processor is configured to navigate the materials handling vehicle outside of the racking system aisle in the modified operating state, in an additional operating state that is within or outside of the end-of-aisle limit, or in a combination of operating states selected therefrom.

In a forty-sixth aspect, comprising the materials handling vehicle of any of the forty-third aspect to the forty-fifth aspect, the vehicle position processor is configured to determine whether the operating state of the materials handling vehicle exceeds the end-of-aisle limit when the expected position of the materials handling vehicle corresponds to an end of the racking system aisle.

In one other embodiment, in a forty-seventh aspect, a materials handling vehicle comprising a camera, a vehicle position processor, and a drive mechanism configured to move the materials handling vehicle along an inventory transit surface, wherein the camera is configured to capture images comprising an aisle exit identifier for a racking system aisle of a multilevel warehouse racking system. The vehicle position processor is configured to generate end-of-aisle positional data from an image of an aisle exit identifier, as captured by the camera, generate a vehicle pose of the materials handling vehicle relative to the aisle exit identifier using the end-of-aisle positional data, generate an inventory transit surface position of the materials handling vehicle along the inventory transit surface using the end-of-aisle positional data and the vehicle pose, navigate the materials handing vehicle to exit the racking system aisle, and update the inventory transit surface position of the materials handling vehicle using a tag identifier component of the materials handling vehicle when the materials handling vehicle is outside of the racking system aisle.

In a forty-eighth aspect, comprising the materials handling vehicle of the forty-seventh aspect, the vehicle position processor is configured to generate out-of-aisle positional data from a tag identifier, as received by the tag identifier component, and update the vehicle pose of the materials handling vehicle relative to the tag identifier using the out-of-aisle positional data.

In a forty-ninth aspect, comprising the materials handling vehicle of the forty-seventh aspect or the forty-eighth aspect, the vehicle position processor is further configured to generate the inventory transit surface position of the materials handling vehicle from an image of at least a portion of a rack leg positioned in the racking system aisle.

In a fiftieth aspect, comprising the materials handling vehicle of any of the forty-seventh aspect to the forty-ninth aspect, the camera is configured to capture images comprising (i) an aisle entry identifier for a racking system aisle of the multilevel warehouse racking system, and (ii) at least a portion of a rack leg positioned in the racking system aisle. The vehicle position processor is configured to generate end-of-aisle positional data and aisle-specific rack leg spacing data from an image of an aisle entry identifier, as captured by the camera, generate an initial position of the materials handling vehicle along the inventory transit surface in a racking system aisle using the end-of-aisle positional data, generate an expected position of the materials handling vehicle as the vehicle travels down the racking system aisle corresponding to the aisle entry identifier from the end-of-aisle positional data and the aisle-specific rack leg spacing data, and update the inventory transit surface position using the expected position.

In a fifty-first aspect, comprising the materials handling vehicle of the fiftieth aspect, the vehicle position processor is further configured to update the inventory transit surface position of the materials handling vehicle using a dead reckoning component of the materials handling vehicle when the materials handling vehicle is outside of the racking system aisle.

In a fifty-second aspect, comprising the materials handling vehicle of any of the forty-seventh aspect to the fifty-first aspect, the materials handling vehicle further comprises a mast assembly, a mast assembly control unit, and a fork carriage assembly, the mast assembly and the mast assembly control unit are configured to move the fork carriage assembly along a vertical lift axis, and the camera is secured to the fork carriage assembly and is configured to capture (i) a forks-down image of at least a portion of a rack leg positioned in a racking system aisle of the multilevel warehouse racking system, and a forks-up image of at least a portion of a rack leg positioned in a racking system aisle of the multilevel warehouse racking system. The vehicle position processor is configured to generate a forks-down coordinate X1 of the camera along a horizontal axis from the forks-down image of the rack leg, generate a forks-up coordinate X2 of the camera along a horizontal axis from a forks-up image of the rack leg captured with the fork carriage assembly at a lift height H1, determine a mast sway offset as a difference between the forks-down coordinate X1 and the forks-up coordinate X2, determine a horizontally advanced position of the materials handling vehicle with the fork carriage assembly at the lift height H1 using the mast sway offset and a subsequently captured forks-up image of at least a portion of a rack leg positioned in the racking system aisle, and update the inventory transit surface position using the horizontally advanced position.

In a fifty-third aspect, comprising the materials handling vehicle of any of the forty-seventh aspect to the fifty-second aspect, the vehicle position processor is configured to generate end-of-aisle limit data comprising an end-of-aisle limit from the image of the aisle exit identifier, as captured by the camera, determine whether the materials handling vehicle exceeds the end-of-aisle limit, transmit a limit-based command to the drive mechanism of the materials handling vehicle when an operating state of the materials handling vehicle exceeds the end-of-aisle limit, initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

In a fifty-fourth aspect, comprising the materials handling vehicle of the fifty-third aspect, the end-of-aisle limit comprises a speed limit, a lift height limit, an acceleration limit, a deceleration limit, a lift acceleration limit, a lift deceleration limit, or combinations thereof.

In a fifty-fifth aspect, comprising the materials handling vehicle of the fifty-third aspect or the fifty-fourth aspect, the vehicle position processor is configured to navigate the materials handling vehicle outside of the racking system aisle in the modified operating state, in an additional operating state that is within or outside of the end-of-aisle limit, or in a combination of operating states selected therefrom.

In a fifty-sixth aspect, comprising the materials handling vehicle of any of the forty-seventh aspect to the fifty-fifth aspect, the camera is configured to capture an image comprising an aisle entry identifier for a racking system aisle of a multilevel warehouse racking system, and the vehicle position processor is configured to generate end-of-aisle limit data comprising an end-of-aisle limit from the image of the aisle entry identifier, as captured by the camera, determine whether an operating state of the materials handling vehicle exceeds the end-of-aisle limit when the inventory transit surface position of the materials handling vehicle corresponds to an end of the racking system aisle, transmit a limit-based command to the drive mechanism of the materials handling vehicle when the operating state of the materials handling vehicle exceeds the end-of-aisle limit, initiate a vehicle action based on the limit-based command, the vehicle action configured to modify operation of the materials handling vehicle to a modified operating state within the end-of-aisle limit, and navigate the materials handling vehicle to exit the racking system aisle in the modified operating state.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein generally relate to localization techniques for extracting features from rack leg features through use of one or more rack leg imaging modules as described herein. Localization is utilized herein to refer to any of a variety of system configurations that enable active tracking of a vehicle location in a warehouse, industrial or commercial facility, or other environment. For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes. The concepts of the present disclosure are not limited to any particular localization system configuration and are deemed to be applicable to any of a variety of conventional and yet-to-be developed localization systems. Such localizations systems may include those described in U.S. Pat. No. 9,349,181 issued on May 24, 2016, entitled LOST VEHICLE RECOVERY UTILIZING ASSOCIATED FEATURE PAIRS, and U.S. Pat. No. 9,984,467 issued May 29, 2018, entitled VEHICLE POSITIONING OR NAVIGATION UTILIZING ASSOCIATED FEATURE PAIRS.

The localization systems may be used to localize and/or navigate an industrial vehicle through a warehouse environment 150 (FIG. 1B) that includes a racking structure, which may be a warehouse, stock yard, or the like. Suitably, the rack leg features may be utilized by a rack leg imaging module to capture images of the rack leg features to initialize localization and update accumulated odometry as described herein. In some embodiments, the rack leg imaging module including a camera can be mounted to an industrial vehicle (e.g., automated guided vehicle or a manually guided vehicle) that navigates through a warehouse. The input image can be any image captured from the camera prior to extracting features from the image.

Figure 1A:
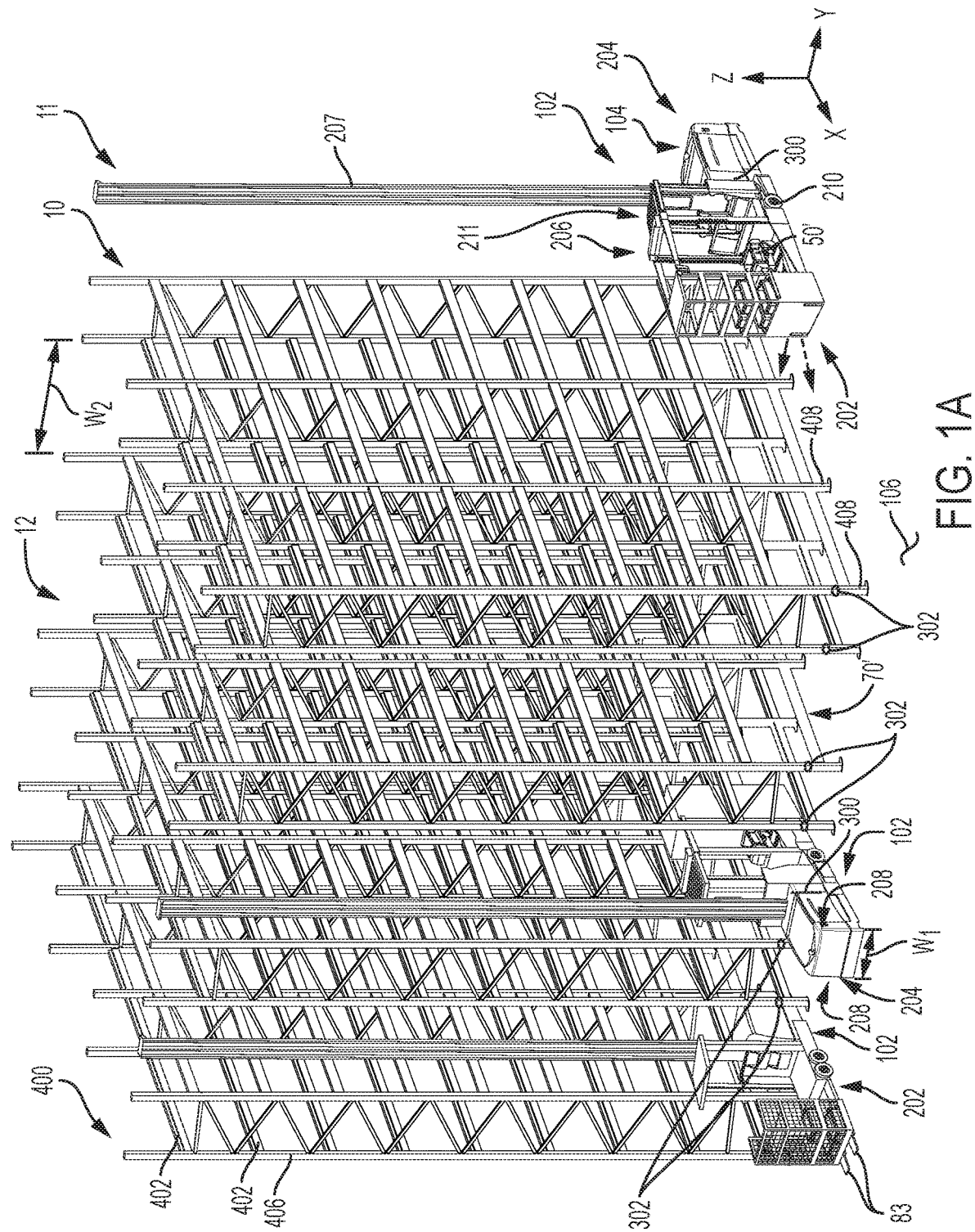
FIG. 1A depicts a plurality of vehicles for localization in a warehouse including a warehouse racking system, according to one or more embodiments shown and described herein.

Referring now to FIG. 1A, a materials handling vehicle 102 can be configured to navigate through a warehouse environment 150 (FIG. 1B) such as a warehouse 11. The materials handling vehicle 102 can comprise a drive mechanism configured to move the materials handling vehicle 102 along an inventory transit surface 106, a materials handling mechanism configured to place goods on and/or retrieve goods from a storage bay of a multilevel warehouse racking system 12 in the warehouse 11 of the warehouse environment 150, and vehicle control architecture in communication with the drive and materials handling mechanisms. In an embodiment, the materials handling mechanism is configured to move materials along a vertically-oriented materials handling axis.

The materials handling vehicle 102 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The aforementioned materials handling vehicles such as the vehicle 102 may include lift trucks available from Crown Equipment Corporation such as, for example, SP Series Order Pickers such as the Crown SP 3500/4500 Series Order Picker and/or TSP Turret Trucks such as one of the TSP 6500 Truck Series. The materials handling vehicles may incorporate automated guidance vehicle ("AGV") functionality using, for example, wire guidance or other guidance features for AGV positioning system functionality.

The industrial vehicle can be configured to automatically or manually navigate an inventory transit surface 106 of the warehouse 11 along a desired path. Accordingly, the materials handling vehicle 102 can be directed forwards and backwards by rotation of one or more wheels 210. Additionally, the materials handling vehicle 102 can be caused to change direction by steering the one or more wheels 210. Optionally, the vehicle can comprise operator controls for controlling functions of the vehicle such as, but not limited to, the speed of the wheels 210, the orientation of the wheels 210, or the like. The operator controls can comprise controls that are assigned to the functions of the materials handling vehicle 102 such as, for example, switches, buttons, levers, handles, pedals, input/output device, or the like. It is noted that the term "navigate" as used herein means movement control or route planning of a vehicle from one place to another including, but not limited to, plotting a graphical path for a manual vehicle operation, providing a set of turn by turn instructions for manual operation, or providing an automated control guiding the vehicle along a travel path that may include such turn by turn instructions for automated operation.

The warehouse 11 may include the warehouse racking system 12 having a plurality of racks 400 including a plurality of shelves defined between a set of upright rails 406 of a rack 400. Each upright rail 406 of the rack 400 has a rack leg 408 configured to be disposed on and support the upright rail 406 with respect to the inventory transit surface 106. A racking system aisle 70' for navigation of the materials handling vehicle 102 on the inventory transit surface 106 may be defined between a pair of opposing upright rails 406 of racks 400. Alternatively, the racking system aisle 70' or portions of the racking system aisle 70' may be defined by at least one rack 400 and an opposite defining component such as, but not limited to, one or more pallet stacks, a mezzanine, a virtually defined aisle boundary, or the like. Each end of the pair of opposing upright rails 406 is configured to act as an entrance end or an exit end for the materials handling vehicle 102 into the racking system aisle 70'. Identifiers 302, which may be aisle entry identifiers, aisle end identifiers, and/or aisle exit identifiers, may be disposed on the rack legs 408 of at least the exit and entrance ends of the pair of opposing upright rails 406 that form a racking system aisle 70'. The identifiers 302 may include, but are not limited to, stickers or other adhesive or attachable components that include unique codes such as Quick Response (QR) codes. The QR codes may store and provide information about a rack leg 408 including, but not limited to, a position of the rack leg 408 within the warehouse 11 as stored in a warehouse map 30, described in greater detail below. It is to be understood that information described as stored in any type of the identifiers 302 described herein may be stored in other types of identifiers as described herein as well. For example, information stored in a described aisle entry identifier 302 as described herein may also be stored in an aisle end identifier 302 or an aisle exit identifier 302, information stored in a described aisle end identifier 302 as described herein may also be stored in an aisle entry identifier 302 or an aisle exit identifier 302, and information stored in a described aisle exit identifier 302 as described herein may also be stored in an aisle entry identifier 302 or an aisle end identifier 302.

The aisle entry identifier 302 may include a QR code configured to store and provide the racking system information, which may include information about a hole pattern associated with a set of rack legs 408 of the racking system aisle 70' of the multilevel warehouse racking system 12, the set of rack legs 408 including the initial rack leg 408, information about distances between adjacent rack legs 408 of the set of rack legs 408, distance of a rack face of the racking system aisle 70' of the multilevel warehouse racking system 12 to a guidance wire in the racking system aisle 70', a number of rack legs 408 of the set of rack legs 408 of the racking system aisle 70' of the multilevel warehouse racking system 12, or combinations thereof. In embodiments, the information about the hole pattern may include distances between rows of holes and distances between columns of holes of each rack leg 408 of the racking system aisle 70' of the multilevel warehouse racking system 12. The racking system information may further include information regarding a distance between rack legs 408 in the racking system aisle 70', and the expected position is calculated by adding the distance between rack legs 408 in the racking system aisle 70' to a previous distance associated with a previously detected rack leg 408.

Thus, the QR codes may further store and provide information including, but not limited to, information about a hole pattern associated with a set of rack legs 408 of a rack 400 defining an outer aisle boundary, distances between rack legs 408 of the rack 400 referable to herein as a "tick" distance, the rack 400 defining the outer aisle boundary, distance from a rack face of the rack 400 to a guidance wire for a given racking system aisle 70', and decoding data configured to permit decoding of a localization target string into a target pose. The hole pattern information may include, for example, distances between rows and distances between columns of holes of a rack leg 408. The QR codes may further store and provide information about a number of rack legs 408 in a given racking system aisle 70' based on information associated with an observed rack leg 408. Thus, the QR codes may contain data about a rack leg pattern, rack leg spacing, number of rack legs, and rack distance from a materials handling vehicle 102 centerline along with a guidance wire on the inventory transit surface 106 in a racking system aisle 70' for a plurality of rack legs 408 associated with the racking system aisle 70' to allow for subsequent use of the plurality of rack legs 408 associated with the racking system aisle 70' for localization of the materials handling vehicle 102. The materials handling vehicle 102 may be configured to be disposed on a guidance system, such as the guidance wire that may be utilized as a wire guidance for vehicle navigation on the inventory transit surface 106, a guidance rail utilized for vehicle navigation on the inventory transit surface 106, or the like. It is contemplated within the scope of this disclosure that the embodiments described herein may be utilized with such types of guidance systems as described or yet-to-be-developed. In embodiments, different racking system aisles 70' in the warehouse may have different spacing between upright rails 406 of a rack 400 and different types of racking of racks 400 in the racking system 12.

Figure 1B:
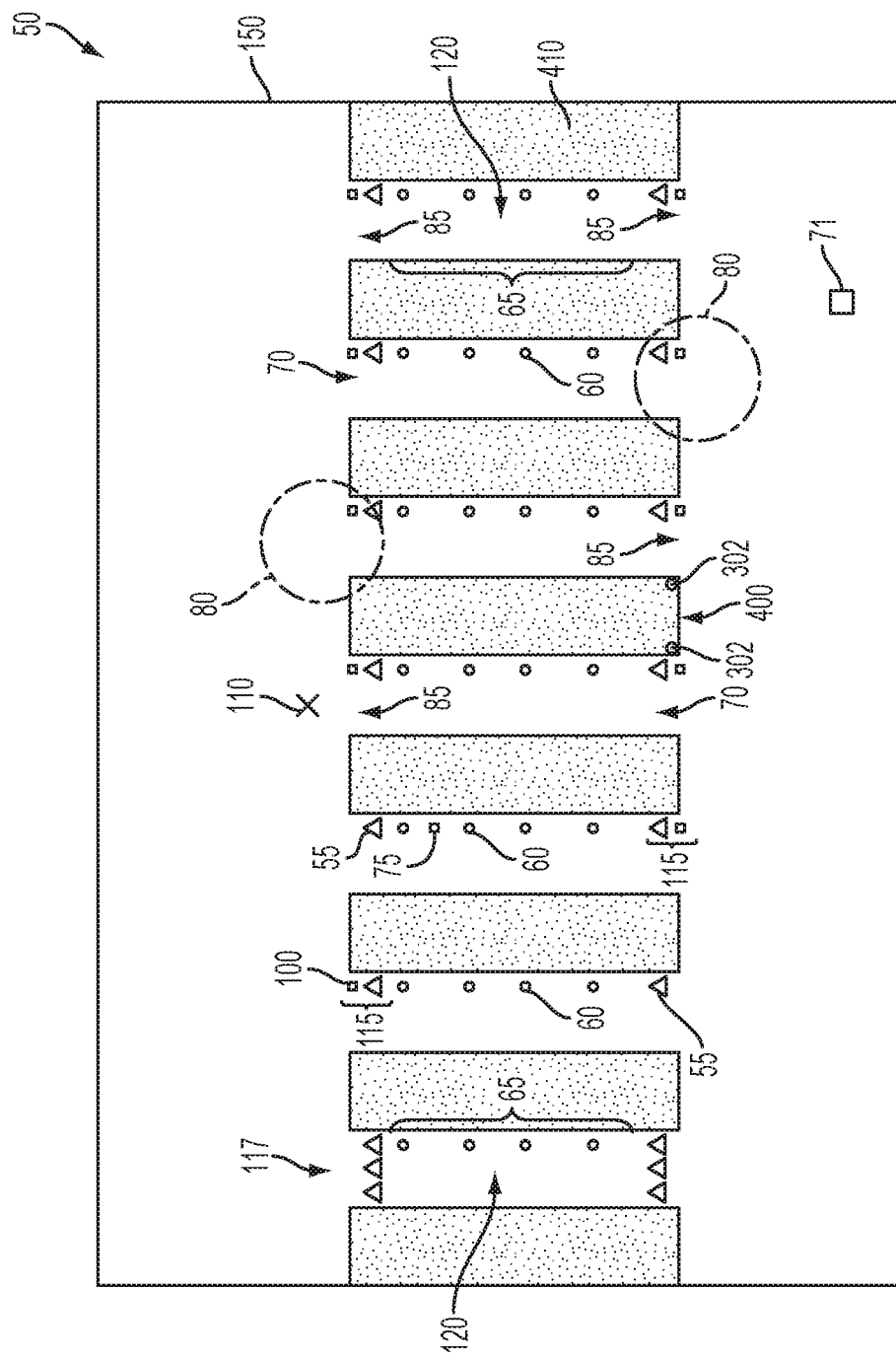
FIG. 1B depicts a schematic plan view of a warehouse environment utilizing tag reading technology and out of aisle identifier technology, according to one or more embodiments shown and described herein

Referring to FIG. 1B, the warehouse environment 150, which may be the warehouse 11 (FIG. 1A), may include the aisle entry identifiers 302 on a rack 400, one or more out of aisle tag identifiers 71, and/or tag reading technology associated with path defining components 410 such as pallets and/or racks 400. Similar to the rack leg identifiers 302, the one or more out of aisle identifiers 71 may include, but are not limited to, stickers or other adhesive or attachable components that include unique codes such as Quick Response (QR) codes. The tag reading technology may include, for example, a tag layout 50 in a single aisle path 70 (FIG. 2) of a racking system aisle 70' (FIG. 1A), an example of which is described in U.S. Pat. No. 9,811,088 assigned to Crown Equipment Corporation. The tag layout 50 can be constructed to comprise individual tags, such as radio frequency identification (RFID) tags, that are positioned such that the materials handling vehicle 102 will operate under a defined set of vehicle functionality (e.g., vehicle function data) and/or tag-dependent position data that will endure until the materials handling vehicle 102 identifies another individual tag of the tag layout 50 with a new correlation of vehicle functionality. Information about a first rack leg 408 may be stored in, or accessible from, a table using an individual tag associated with the first rack leg 408 such as an RFID tag disposed in a floor surface at the beginning of a racking system aisle 70', where the first rack leg 408 may be placed at the beginning of the racking system aisle 70' or further down the racking system aisle 70'. As a non-limiting example, a set of pallets may be placed in an aisle prior to a rack 400 including the first rack leg 408, and the RFID tag may be placed at the beginning of the aisle to contain information about the first rack leg 408 and the rack 400.

In operation, by way of example and not as a limitation, the tag layout 50 may be utilized with respect to a tag reader 33 and the reader module 35 of the materials handling vehicle 102 (FIG. 2), examples of which are also described in U.S. Pat. No. 9,811,088 assigned to Crown Equipment Corporation. The reader module 35 may include a reader memory coupled to a reader processor. The tag reader 33 and the reader module 35 may cooperate to identify individual tags of a tag layout 50. Each individual tag of the tag layout 50 may correspond to a unique identification code, such as a code including rack leg information of a rack leg 408 associated with an individual tag at the beginning of the aisle path 70 of the racking system aisle 70', for example. Each unique identification code corresponds to a memory location in the reader memory of the reader module 35, which memory location includes at least one of indexing data, operational data, and tag position data. As a non-limiting example, the tag reader 33 and the reader module 35 cooperate to determine vehicle functionality by identifying an individual tag of the tag layout 50 and associating the identified tag with a memory location in the reader memory to retrieve at least one of indexing data, operational data, and tag position data. The individual tags comprise a plurality of zone identification tags 55 and a plurality of zone tags 60. Each zone identification tag 55 occupies a position in the tag layout 50 that corresponds to a unique set of zone tags 65 that each comprise a plurality of zone tags 60. In one embodiment, each unique set of zone tags 65 comprises a plurality of zone tags 60, one or more function tags 100, one or more aisle extension tags 110, one or more aisle entry tags 75, or combinations thereof. For example, and not by way of limitation, respective zone tags 60 of the unique set of zone tags 65 that are the furthest from a midpoint 120 of the aisle path 70 of the racking system aisle 70' may comprise both vehicle functionality and end-of-aisle vehicle functionality.

As a non-limiting example, the individual tags of the tag layout 50 may comprise a plurality of aisle entry tags 75 that are positioned along an aisle path 70 between vehicle entry or vehicle exit portions 80 of the aisle path 70. A reader module 35 on the materials handling vehicle 102 (FIG. 2), an example of which is also described in U.S. Pat. No. 9,811,088 assigned to Crown Equipment Corporation, may discriminate between the aisle entry tags 75 and the individual tags of the tag layout 50 along the aisle path 70 and correlate end-of-aisle vehicle functionality with an identified aisle entry tag 75. A vehicle controller may control operational functions of the industrial vehicle hardware of the materials handling vehicle 102 in response to the correlation of end-of-aisle vehicle functionality with an identified aisle entry tag 75. In this manner, a tag layout 50 can be constructed to comprise aisle entry tags 75 that are positioned within an aisle path 70 of the racking system aisle 70' such that particular end-of-aisle vehicle functionality can be implemented as an industrial vehicle 10, traveling within an aisle path 70 of the racking system aisle 70', approaches the vehicle entry or vehicle exit portion 80 of the aisle path 70. The exit portion distance is a quantity of length measured between a current position of the materials handling vehicle 102 and the end point 85 of respective aisle paths 70. The reader module 35 may discriminate between the outer end-cap tag and the inner end-cap tag of the end-cap pair 115 and correlate an identified outer end-cap tag with exit-specific vehicle functionality and correlate an identified inner end-cap tag with entry-specific vehicle functionality. In one embodiment, the tag layout 50 may comprise one or more end-cap rows 117 which comprise a plurality of end-cap pairs 115. The one or more end-cap rows 117 are spaced across respective end points 85 of an aisle path 70 such that an industrial vehicle entering or exiting the aisle path 70 will identify the individual tags of the end-cap row 117 regardless of where the materials handling vehicle 102 crosses the end-cap row 117 within the vehicle entry or vehicle exit portion 80 of the aisle path 70.

The materials handling vehicle 102 can further comprise a rack leg imaging module 300 including a camera 304 (FIG. 2) for capturing images such as input images of rack leg features. The camera 304 can be any device capable of capturing the visual appearance of an object and transforming the visual appearance into an image. Accordingly, the camera 304 can comprise an image sensor such as, for example, a charge coupled device, complementary metal-oxide-semiconductor sensor, or functional equivalents thereof. In some embodiments, the materials handling vehicle 102 can be located within the warehouse 11 and be configured to capture images of a rack leg 408 of an upright rail 406 of a rack 400 in the warehouse 11. In order to capture rack leg images, the camera 304 can be mounted to at least one lateral side 208 of the materials handling vehicle 102 and have a field of view laterally focused toward the rack leg 408, as described in greater detail below. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing rack leg uprights.

The materials handling vehicle 102 includes a vehicle body 104. The vehicle body 104 may include a fork side 202 and a power unit side 204. In embodiments, the fork side 202 may define a front of the materials handling vehicle 102 configured to move in a forward direction along an inventory transit surface 106 that is horizontally-oriented, and the power unit side 204 may define a rear of the materials handling vehicle 102 configured to move in a reverse direction along the inventory transit surface 106. The fork side 202 may include a pair of fork tines 83. In embodiments, the vehicle body 104 may include a fork carriage assembly 206 positioned at the fork side 202 that may be movably coupled to a mast assembly 207. The fork carriage assembly 206 may be vertically movable along the mast assembly 207 to retrieve or deposit a tote 50' with respect to a rack 400, which may be a multilevel rack in a very narrow aisle (VNA) warehouse. The materials handling vehicle 102 may include a sensor location on the fork side 202, the power unit side 204, or both to facilitate autonomous or semiautonomous vehicle travel. The materials handling vehicle 102 may also comprise an operator compartment 211 that may also be movably coupled to the mast assembly 207. This operator compartment 211 may be positioned between the fork carriage assembly 206 and the power unit side 204 of the vehicle body 104. The vehicle body 104 may also include a pair of lateral sides 208 extending between the fork side 202 and the power unit side 204 of the vehicle body 104. The pair of lateral sides 208 thus extend between the front and rear of the materials handling vehicle 102. The pair of lateral sides 208 may define a width $W_1$. In VNA environments, a warehouse aisle such as a racking system aisle 70' in which the materials handling vehicle 102 may be positioned may be characterized by an aisle width $W_2$, where $W_2-W_1<W$ inches and W is in a range of from about 2 inches to about 4 inches (and $W_2>W_1$).

Figure 4:
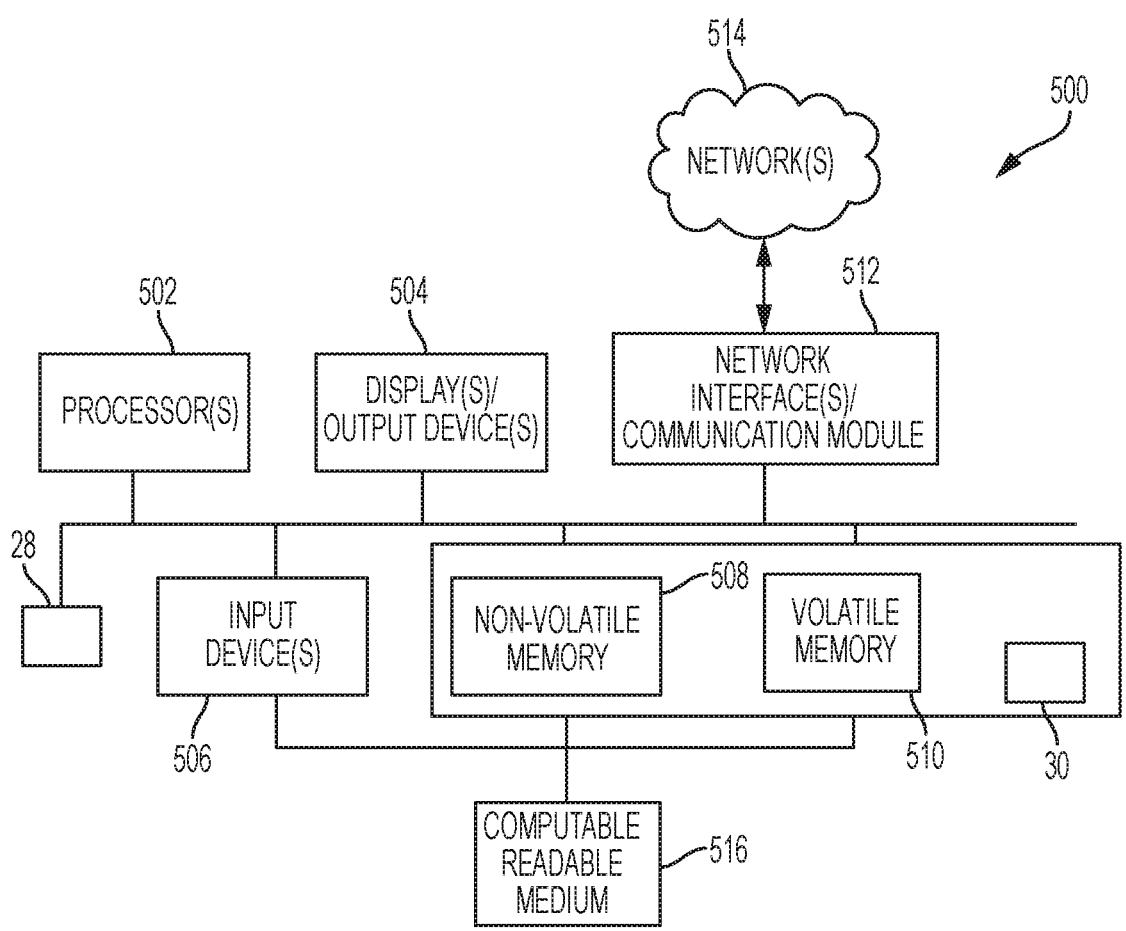
FIG. 4 depicts a schematic illustration of a system including a rack leg imaging module system and for implementing computer and software based methods to utilize the rack leg imaging module of FIG. 2, according to one or more embodiments shown and described herein.

The embodiments described herein can comprise a system 500 including one or more vehicular processors such as processors 502 (FIG. 4) communicatively coupled to the camera 304 and a memory. In embodiments, the processors 502 may include a vehicle position calibration processor, a vehicle position processor, a mast assembly control unit, and/or an image capture processor. A network interface hardware 512 may facilitate communications over a network 514 via wires, a wide area network, a local area network, a personal area network, a cellular network, a satellite network, and the like. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The network interface hardware 512 can be communicatively coupled to any device capable of transmitting and/or receiving data via the network 514. Accordingly, the network interface hardware 512 can include a communication transceiver for sending and/or receiving any wired or wireless communication. For example, the network interface hardware 512 may include an antenna, a modem, LAN port, Wi-Fi card, WiMax card, mobile communications hardware, near-field communication hardware, satellite communication hardware and/or any wired or wireless hardware for communicating with other networks and/or devices.

The one or more processors 502 can execute machine readable instructions to implement any of the methods or functions described herein automatically. Memory as at least one of non-volatile memory 508 or volatile memory 510 in a computer readable medium 516 (e.g., memory) for storing machine readable instructions can be communicatively coupled to the one or more processors 502, the camera 304, or any combination thereof. The one or more processors 502 can comprise a processor, an integrated circuit, a microchip, a computer, or any other computing device capable of executing machine readable instructions or that has been configured to execute functions in a manner analogous to machine readable instructions. The computer readable medium 516 can comprise RAM, ROM, a flash memory, a hard drive, or any non-transitory device capable of storing machine readable instructions.

The one or more processors 502 and the memory may be integral with the camera 304. Alternatively or additionally, each of the one or more processors 502 and the memory can be integral with the materials handling vehicle 102. Moreover, each of the one or more processors 502 and the memory can be separated from the materials handling vehicle 102 and the camera 304. For example, a management server, server, or a mobile computing device can comprise the one or more processors 502, the memory, or both. It is noted that the one or more processors 502, the memory, and the camera 304 may be discrete components communicatively coupled with one another without departing from the scope of the present disclosure. Accordingly, in some embodiments, components of the one or more processors 502, components of the memory, and components of the camera 304 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium such as computer readable medium 516. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

In embodiments, one or more warehouse maps 30 described herein may be stored in the memory. The system 500 can include one or more displays and/or output devices 504 such as monitors, speakers, headphones, projectors, wearable-displays, holographic displays, and/or printers, for example. Output devices 504 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The system 500 may further include one or more input devices 506 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 506 may further include cameras (with or without audio recording), such as digital and/or analog cameras, still cameras, video cameras, thermal imaging cameras, infrared cameras, cameras with a charge-couple display, night-vision cameras, three dimensional cameras, webcams, audio recorders, and the like. For example, an input device 506 may include the camera 304 described herein. As a non-limiting example, the input device 506 may be communicatively coupled to a rack leg imaging module system 28 including the camera 304 of the rack leg imaging module 300 as described herein.

Figure 5:
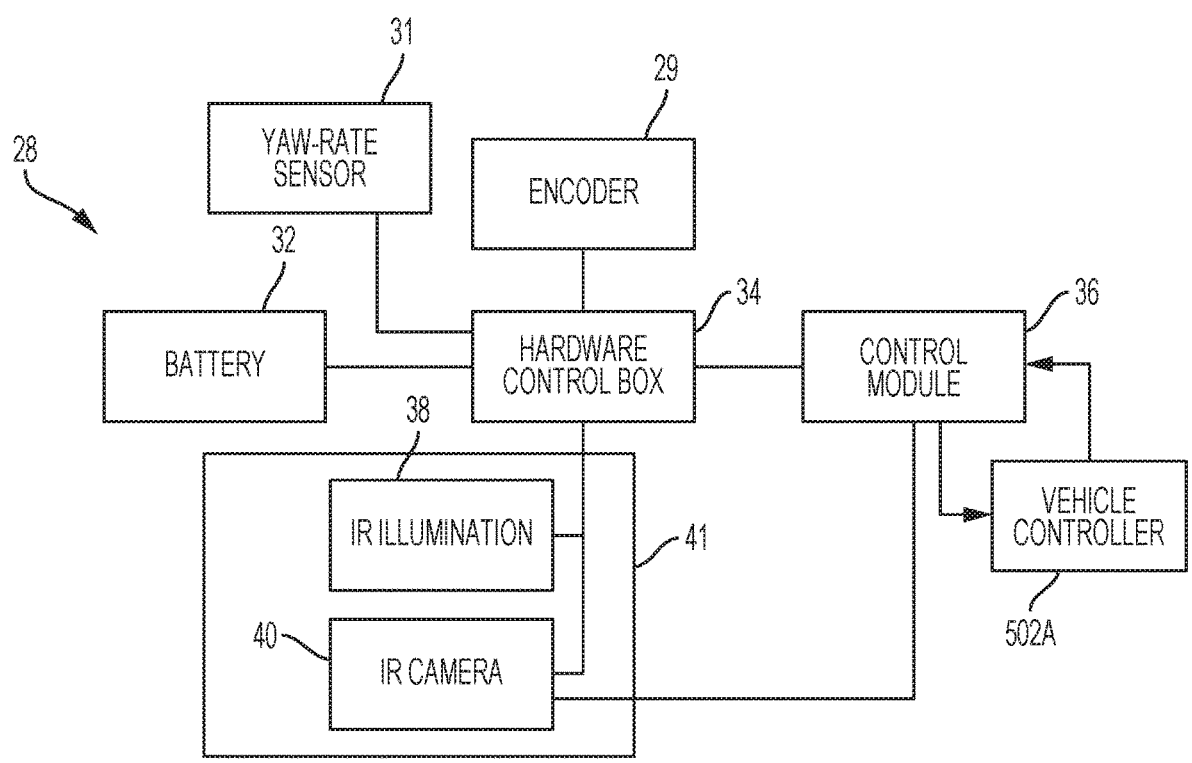
FIG. 5 depicts a schematic illustration of the rack leg imaging module system of FIG. 4 including a rack leg imaging module, a control module, and a vehicle controller.

Referring to FIG. 5, the rack leg imaging module system 28 includes communicatively coupled components including, but not limited to, an odometry module 29, a hardware control box 34, a control module 36, an infrared (IR) illumination module 38, an IR camera module 40, a battery 32, a vehicle controller 502A, and a yaw rate sensor 31. The IR illumination module 38 and IR camera module 40 in combination are referenceable to as an IR Camera and IR Illumination Module 41, forming a rack leg imaging module to operate as, for example, the rack leg imaging module 300. As will be described in greater detail below, the one or more IR Camera and IR Illumination Modules described herein may include the IR camera module 40 communicatively coupled to the camera 304 of the rack leg imaging module 300 and the IR illumination module 38 communicatively coupled to the plurality of illuminators 306 of the rack leg imaging module 300 as described herein. In embodiments, the battery 32 may be a vehicle battery of the materials handling vehicle 102 or a separate battery dedicated to the rack leg imaging module system 28. The hardware control box 34 may include an internal layout with a light emitting diode (LED) driver to regulate electrical current to a plurality of LEDs as a plurality of illuminators 306, a microcontroller to count ticks of the odometry module 29, and a DC-DC converter to power the camera 304. The odometry module 29 may be any conventional or yet to be developed odometry module configured to generate materials handling vehicle odometry data, such as via a wheel encoder of the materials handling vehicle 102.

The encoder 29 may be a drive wheel encoder or a load wheel encoder of the vehicle 102. The drive wheel encoder of the vehicle 102 may be associated with wheels of the vehicle 102 that move the vehicle 102 on the inventory transit surface and may be powered by a vehicle motor. The load wheel encoder may be an encoder associated with the wheel disposed near the fork carriage assembly 206 that follow the motion of the vehicle 102 and provide for less slip. The encoder 29, such as when a load wheel encoder, may be powered by a single one of the modules 51, 61. In FIG. 5, the encoder 29 as a load wheel encoder may be powered by the IR Camera and IR Illumination Module 41. The encoder 29 may provide encoder/quadrature data to the IR Camera and IR Illumination Module 41. The IR Camera and IR Illumination Module 41 generates and outputs image information sent to the control module 36 that, along with tick information as distances between racks, generates a position of the vehicle 102 as described herein based on the images and tick information.

The control module 36 is communicatively coupled to the vehicle controller 502A, such as a vehicle control area network bus ("CAN bus") controller. The CAN bus controller incorporates a robust vehicle bus standard to allow microcontrollers and vehicle devices to communicate within the vehicle systems without a host computer. The CAN bus controller incorporates a message-based protocol that cooperates with multiplex electrical wiring within the vehicle 102. Further, the CAN bus controller is configured to permit interaction between various vehicle systems to allow for a wide range of functionality and control through use of software rather than hard wiring between such systems. By way of example, and not as a limitation, a vehicle subsystem may control actuators or receive feedback from sensors through the CAN bus controller to control a vehicle functionality. The CAN bus is configure to collate various sensor inputs from one or more different vehicle subsystems as needed to determine whether to enact a vehicle functionality of the vehicle subsystem based on those sensor inputs.

The vehicle controller 502A is configured to send vehicle information such as a steer wheel angle, a steer wheel speed, and a wire guidance state to the control module 36, which generates a position of the vehicle 102 based on the received vehicle information, images, and tick information and sends the position of the vehicle 102 to the vehicle controller 502A.

The IR illumination module 38 may comprise the plurality of illuminators 306 of the rack leg imaging module 300 as described herein, and the IR camera module 40 may comprise the camera 304 of the rack leg imaging module 300 as described herein. As a non-limiting example and embodiment, the rack leg imaging module system 28 includes the rack leg imaging module 300 including the camera 304 and the plurality of illuminators 306, LED drivers including an on/off digital control configured to control the plurality of illuminators 306, an odometry module 29, the control module 36, and DC-DC converters to power from the battery 32 to the connected hardware. The control module 36 is configured to trigger image capture by the camera 304, accumulate encoder ticks as described in greater detail below, and report tick information to the one or more processors 502 through serial communication. The control module 36 may further be configured to operate in two modes, a QR initialization mode to initialize an initial position of the materials handling vehicle 102 in an aisle entrance of a racking system aisle 70' in the warehouse 11 and a position maintenance mode to maintain and update the position of the materials handling vehicle 102 in the racking system aisle 70' during travel on the inventory transit surface 106, as described in greater detail below. Modes and parameters of the rack leg imaging module system 28 may be set by sending serial commands to the control module 36, which may operate as one of the one or more processors 502 of the system 500.

The rack leg imaging module system 28 may be communicatively coupled to a controller access network (CAN) bus of the materials handling vehicle 102 and may utilize an associated wire guidance or rail guidance signal of the materials handling vehicle 102 for localization. The rack leg imaging module system 28 may further make use of CAN odometry data associated with the materials handling vehicle 102, and publish the position to CAN, for automatic positioning system and navigation use. The rack leg imaging module system 28 may operate with the CAN interface of the materials handling vehicle 102 to provide rack leg imaging to the materials handling vehicle 102. The rack leg imaging module system 28 may further maintain position of the materials handling vehicle 102 in an onboard memory, even when power of the materials handling vehicle 102 is turned off.

As is noted above and referring again to FIG. 4, the materials handling vehicle 102 can comprise or be communicatively coupled with the one or more processors 502. Accordingly, the one or more processors 502 can execute machine readable instructions to operate or replace the function of the operator controls. The machine readable instructions can be stored upon the memory. Accordingly, in some embodiments, the materials handling vehicle 102 can be navigated automatically by the one or more processors 502 executing the machine readable instructions. In some embodiments, the location of the vehicle can be monitored by the localization system as the materials handling vehicle 102 is navigated.

For example, the materials handling vehicle 102 can automatically navigate along the inventory transit surface 106 of the warehouse 11 along a desired path to a desired position based upon a localized position of the materials handling vehicle 102. In some embodiments, the materials handling vehicle 102 can determine the localized position of the materials handling vehicle 102 with respect to the warehouse 11. The determination of the localized position of the materials handling vehicle 102 can be performed by comparing image data to map data. The map data can be stored locally in the memory as one or more warehouse maps 30, which can be updated periodically, or map data provided by a server or the like. In embodiments, an industrial facility map comprises a mapping of the racking system features, such as each end rack leg 408 of each upright rail 406 of a rack 400 of the racking system 12 at each aisle end, where each end rack leg 408 is associated with a unique code, including but not limited to codes such as QR codes on aisle entry identifiers 302 including rack leg identification information as described herein. Given the localized position and the desired position, a travel path can be determined for the materials handling vehicle 102. Once the travel path is known, the materials handling vehicle 102 can travel along the travel path to navigate the inventory transit surface 106 of the warehouse 11. Specifically, the one or more processors 502 can execute machine readable instructions to perform localization system functions and operate the materials handling vehicle 102. In one embodiment, the one or more processors 502 can adjust the steering of the wheels 210 and control the throttle to cause the materials handling vehicle 102 to navigate the inventory transit surface 106.

Figure 2:
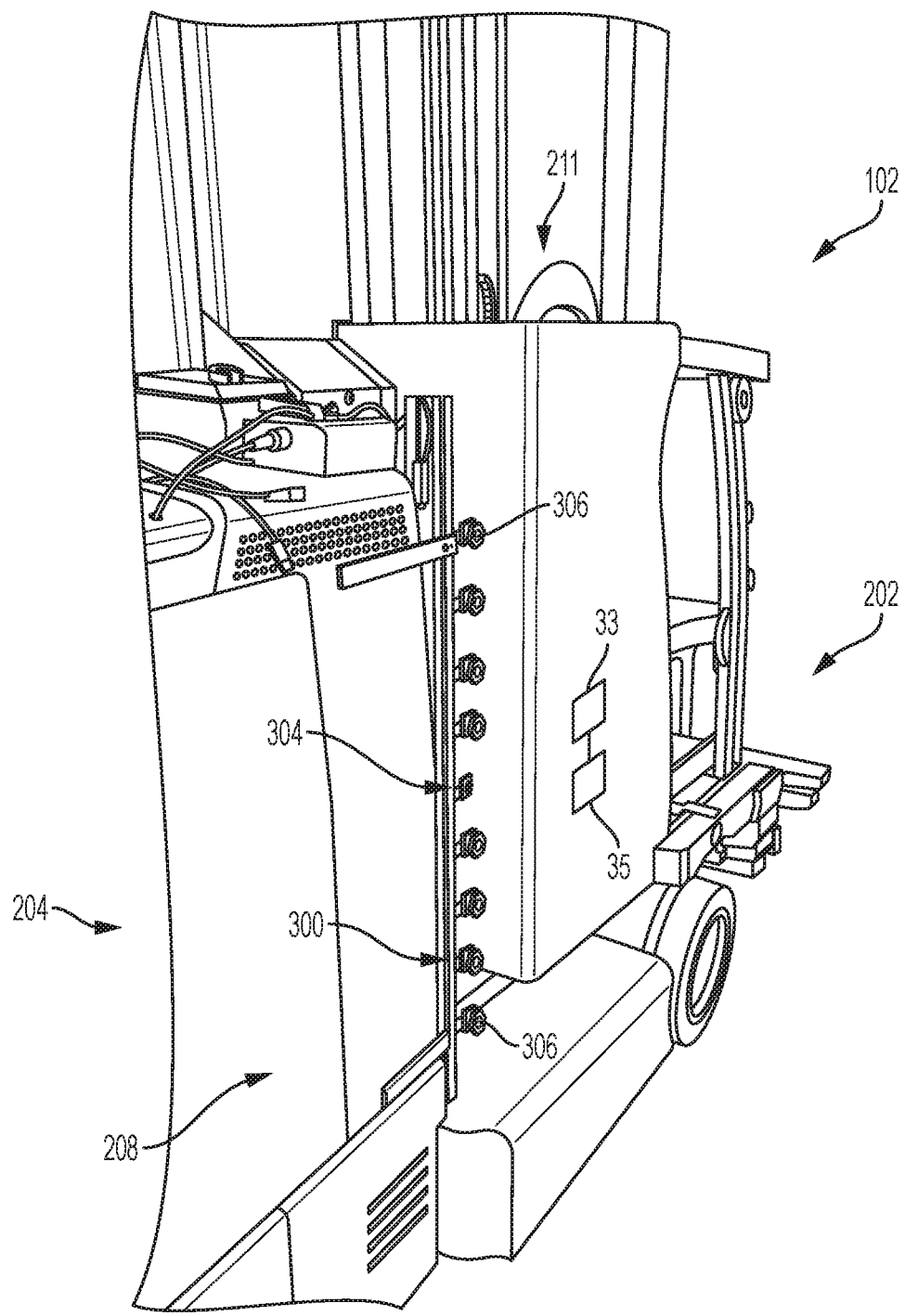
FIG. 2 depicts a rack leg imaging module on a vehicle of the plurality of vehicles of FIG. 1A, according to one or more embodiments shown and described herein.

Referring to FIG. 2, a rack leg imaging module 300 is shown disposed on a lateral side 208 of a materials handling vehicle 102 between the power unit side 204 and the fork side 202. The rack leg imaging module 300 is further shown as including an arrangement of a camera 304 and an illumination module including a plurality of illuminators 306. The rack leg imaging module 300 may include the camera 304 and a vertically oriented array of infrared (IR) illuminators 306 and an IR bandpass filter. The vertically-oriented array of IR illuminators may be disposed on at least one of the pair of lateral sides 208 of the materials handling vehicle 102. The camera 304 may be vertically aligned with the vertically oriented array of IR illuminators 306 and configured to capture images of at least a portion of a rack leg 408 positioned in a racking system aisle 70' of a multilevel warehouse racking system 12. An image capture processor (e.g., of the processors 502) may be configured to generate a filtered IR rack leg image by coordinating the capture of a rack leg image of at least a portion of a rack leg 408 with illumination of the rack leg 408 by the vertically oriented array of IR illuminators 306 and with band pass filtering of external warehouse lighting surrounding the rack leg 408 from the rack leg image using the IR bandpass filter. The vehicle control architecture may be configured to navigate the materials handling vehicle 102 along the inventory transit surface 106 using the filtered IR rack leg image.

In an embodiment, the camera 304 may include a lens and the IR bandpass filter. The lens may be, but is not limited to, a wide angle lens, a fish eye lens, a narrow angle lens, or the like. The lens may be dependent on a leg pattern used for a rack leg 408 in the warehouse environment 150. The plurality of illuminators 306 of the illumination module may include, but are not limited to, a plurality of LEDs or other types of illumination such as incandescent, fluorescent, IR laser diode, and the like. As a non-limiting example, the plurality of illuminators 306 of the illumination module may include a vertical series of distributed IR LEDs, each including a narrow beam reflector lens. The rack leg imaging module 300 is mounted on at least one lateral side 208 of the materials handling vehicle 102 and configured to laterally face a rack 400 in first lateral direction, such as when the materials handling vehicle 102 is on wire guidance or rail guidance on the inventory transit surface 106 in a racking system aisle 70' defined by the rack 400. The materials handling vehicle 102 may include an opposite rack leg imaging module 300 mounted on the opposite lateral side 208 of the materials handling vehicle 102 and configured to laterally face in a second lateral direction opposite the first lateral direction another rack 400 defining another side of the racking system aisle 70'. Two rack leg imaging modules 300 mounted on opposite lateral sides 208 of the materials handling vehicle 102 allows both sides of the racking system aisle 70' to be utilized for localization, as described in greater detail further below.

Along with a unique code associated with a first aisle entry identifier 302 and the three-dimensional coordinates of the rack leg 408 associated with the first aisle entry identifier 302 to indicate location of the rack leg 408 in the warehouse environment based on the map, the patterns from an image of the rack leg 408 captured by the rack leg imaging module 300 are recorded in a localization feature map for use during localization system operation, as described in greater detail below. In an embodiment, mapping of the QR codes associated with rack legs 408 of racks 400 may occur through manual mapping utilizing a laser tool such as a laser range finder or laser distance meter or other suitable mapping scanning tools. In embodiments, utilized individual tags, such as RFID tags as described herein, may be mapped utilizing same or similar techniques while further using an antenna to identify a location of the individual tag.

The vehicle location of the materials handling vehicle 102 may be verified and/or made more accurate based on the rack leg imaging module 300 as described herein. For a vehicle that is localized but with low accuracy, for example, use of the rack leg imaging module 300 and an aisle entry identifier 302 permits an increase in localization accuracy of the materials handling vehicle 102 upon successful detection of the aisle entry identifier 302. The aisle entry identifier 302 is able to be utilized to initialize a vehicle location or verify the predicted vehicle location and to fix the vehicle localization to a high degree of certainty. Increased uptime in the length of time a materials handling vehicle 102 may be localized through the localization system through use of such rack leg imaging modules 300 enhances value of the vehicle localization in the uptime and in improving accuracy of the localization. By way of example and not as a limitation, uptime associated with the materials handling vehicle 102 references the amount of time the materials handling vehicle 102 may be utilized and not lost, turned off, or otherwise not utilized during periods of downtime. An unknown location of the materials handling vehicle 102 results in disruption of uptime associated with the materials handling vehicle 102 resulting in situations such as inhibited work flow and inefficient vehicle navigation and use. As a non-limiting example, the materials handling vehicle 102 will stop if it becomes lost such that the localization is no longer known, navigation could lead to an incorrect target or pick up location if the localization is incorrect, and the like.

Figure 6:
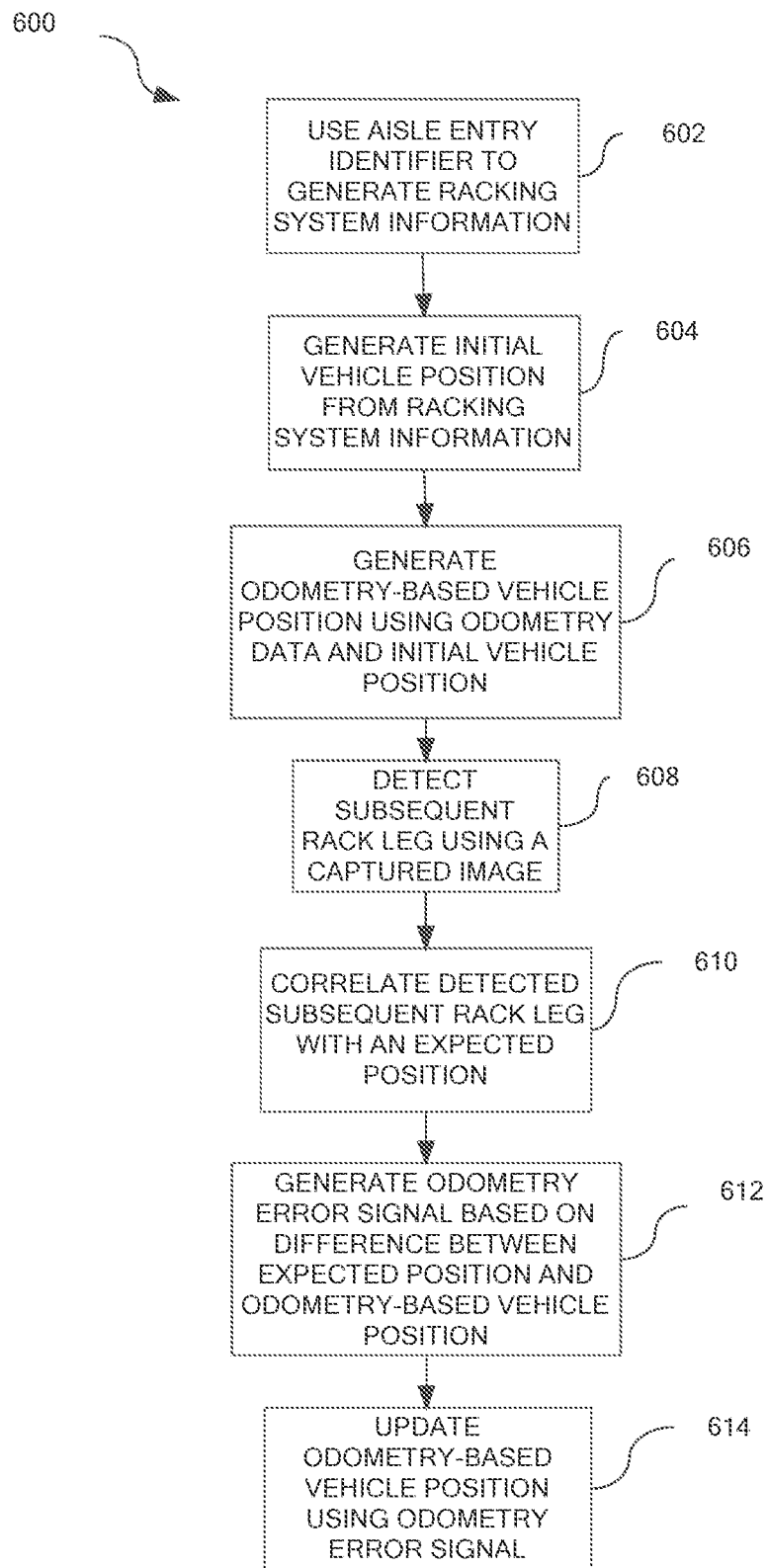
FIG. 6 depicts a flowchart overview of a method for a localization method according to one or more embodiments shown and described herein.

The processes of the rack leg imaging module 300 is set forth in greater detail in FIG. 6. The camera 304 and illuminators 306 of the rack leg imaging module may capture an image of a rack leg 408 that is digitized and may have a stored rack leg pattern superimposed on the digitized image to match the image with a stored rack leg 408.

Referring to FIG. 6, the system 500 through rack leg imaging module system 28 and the camera 304 of the rack leg imaging module 300 is configured to provide rack leg imaging for one or more vehicles 102 that may be disposed on wire guidance or rail guidance in racking system aisles 70' of a warehouse 11. The camera is configured to capture images of (i) an aisle entry identifier 302 positioned to correspond with an entrance of a racking system aisle 70' of a multilevel warehouse racking system 12 and (ii) at least a portion of a rack leg 408 positioned in the racking system aisle 70'. By way of example and not as a limitation, the system 500 is configured to use the camera 304 of the rack leg imaging module 300 to read the aisle entry identifier 302 as a unique code associated with a first rack leg 408 of a rack 400 at an aisle entrance and use odometry data from an odometry module 29, such as a wheel encoder on the materials handling vehicle 102, to keep track of a change in position of the materials handling vehicle 102. The odometry module 29 is configured to generate odometry data representing a distance traveled by the materials handling vehicle 102 along the inventory transit surface 106. The camera 304 is used to continue to identify rack legs 408 that are passed by in the racking system aisle 70' and use of the identifying information to correct any accumulated encoder error and thus calibrate odometry information and the updated position of the materials handling vehicle 102. Parameters associated with the system 500 may be split between storage onboard the rack leg imaging module 300 and storage within each unique code associated with a rack leg 408.

As a non-limiting example, the process 600 follows instructions to capture image(s) of a rack leg 408 at an aisle entrance of a first racking system aisle 70' to initialize a localization position of the materials handling vehicle 102 in the warehouse 11 with respect to the first racking system aisle 70'. As a non-limiting example, the rack leg 408 defines at least a portion of a lateral boundary of the racking system aisle 70' that may be the aisle entrance of the first racking system aisle 70' and includes an aisle entry identifier 302, which may be configured as a sticker on the rack leg 408 including the aisle entry identifier 302 as a unique QR code. The unique QR code may include localization information with respect to the rack leg 408 and information about rack leg patterns associated with the rack legs 408 of a rack 400, such as hole patterns, spacing or "tick" patterns between rack legs 408 of the rack 400, and the like. A plurality of images are captured at a high rate by the camera 304 to read the unique QR code at the aisle entrance, which includes a stored position of the associated rack leg 408, and initialize the position of the materials handling vehicle 102 in the warehouse 11.

Thus, in block 602, the aisle entry identifier 302 is used to generate racking system information indicative of at least (i) a position of an initial rack leg 408 of the racking system aisle 70' along the inventory transit surface 106 and (ii) rack leg spacing in the racking system aisle 70'. In block 604, the initial position of the materials handling vehicle 102 along the inventory transit surface 106 is generated using the position of the initial rack leg 408 from the racking system information. It is noted that reference herein to a value or parameter that is "generated" covers calculating, measuring, estimating, or any combination thereof. The rack leg imaging module 300 may be commissioned with a known position of the materials handling vehicle 102 such that the updated position of the materials handling vehicle 102 is calculated based on the retrieved position of the associated rack leg 408. A position of the QR code in the captured image(s) may be used for fine adjustment of the position of the materials handling vehicle 102, given known camera parameters and optionally a distance of the camera 304 from the rack 400 that may assist, for example, with setting one or more camera parameters based on a the camera distance to capture an optimal, defined image of the rack leg 408.

After initialization in blocks 602-604, the odometry module 29 of the materials handling vehicle 102 is used to maintain vehicle position knowledge. In block 606, an odometry-based position of the materials handling vehicle 102 along the inventory transit surface 106 in the racking system aisle 70' is generated using the odometry data and the initial position of the materials handling vehicle 102. In an embodiment, the rack leg imaging module 300 is commissioned with a known distance traveled per tick and a polarity or direction of travel. Such odometry information is used between the rack legs 408 and captured images of the rack legs to estimate and maintain vehicle position knowledge from a previous image capture. As a non-limiting example, a last image capture is a foundation upon which the odometry is based until a new image is captured to become the last image capture to continue to maintain the vehicle position knowledge as the materials handling vehicle 102 advances along the racking system aisle 70'.

In block 608, a subsequent rack leg 408 is detected using a captured image of at least a portion of the subsequent rack leg 408. For example, images continue to be captured by the camera 304 as the materials handling vehicle 102 travels along the racking system aisle 70' defined by the rack 400 to detect the plurality of rack legs 408 of the rack 400 defining the racking system aisle 70'. Images may be captured by the camera 304 at a high rate as the materials handling vehicle 102 travels along the racking system aisle 70' defined by a rack 400 and including a plurality of rack legs 408. In embodiments, the images may be captured by the camera 304 when the rack leg imaging module 300 expects a rack leg 408 to be in the frame. For example, the camera 304 may be triggered to take an image at a position where a rack leg 408 is expected to appear in the image, which may reduce image processing requirements and camera interface bandwidth requirements as well as power usage.

In block 610, the detected subsequent rack leg 408 is correlated with an expected position of the materials handling vehicle 102 in the racking system aisle 70' using rack leg spacing from the racking system information. As a non-limiting example, such data associated with an expected position of the rack leg 408 and thus associated with an expected position of the materials handling vehicle 102 when at the rack leg 408 may be based on information from the unique code, such as the QR code of the aisle entry identifier 302 and/or the RFID tag of the tag layout 50. Such data may include information of when to trigger a subsequent image capture to capture an image of a subsequent expected rack leg 408 as a next expected data point. A tolerance with respect to that next expected data point may be included as well before and after the data point. In an embodiment, an expected position may be calculated by adding a distance between rack legs 408 in a racking system aisle 70' defined by a rack 400 in units of ticks to a previous number of ticks associated with when the last rack leg 408 was detected. The previous number of ticks may be corrected for offset of the rack leg 408 in the image. The camera 304 and the plurality of illuminators 306 may then be triggered to light and capture an image 450 to detect an expected rack leg 408 when the number of ticks hits a target tick count threshold number.

Figure 3:
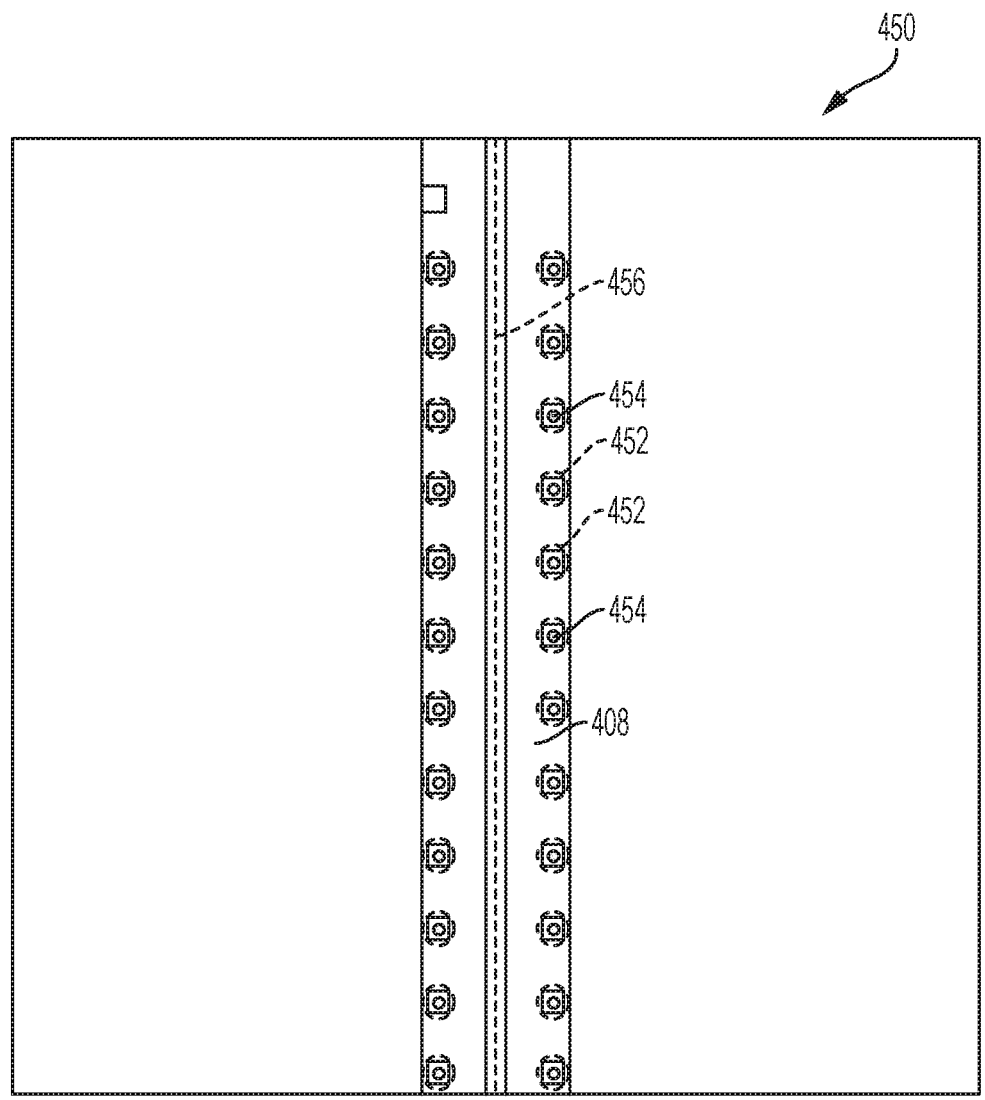
FIG. 3 depicts an image of a rack leg feature of the warehouse racking system of FIG. 1A as captured by the rack leg imaging module of FIG. 2, according to one or more embodiments shown and described herein.

Referring to FIG. 3, an image 450 is captured by the camera 304 to show a detected rack leg 408. Circles 452 are disposed on detected holes of the detected rack leg 408, and an expected dot pattern 454 is matched to those detected holes of the rack leg 408 to generate a best-fit centerline 456. In such embodiments, such features of a rack leg 408 of a rack 400 in the image 450 may be used as features to detect and identify the rack leg 408 due to a common hole pattern distinguished by a computer vision system of the camera 304 and the rack leg imaging module 300 and a pre-identified spacing between the rack legs 408 of the rack 400, which information may be included in the aisle entry identifier 302 of the first rack leg 408 of a racking system aisle 70' defined by the rack 400 of the multilevel warehouse racking system 12. Use of the plurality of illuminators 306 configured to provide flash illumination and the camera 304 configured to capture images with short exposure times using, for example, a global shutter camera, allows for features of the detected rack leg 408 to be captured and identified in the image 450. Further, such a combination of illumination and image capture provides a high contrast image such as the image 450 through illumination of an image foreground and providing a sharp image through prevention of motion blur. Such image characteristics permit image processing that provides reliable and accurate detection of a position of the detected rack leg 408. The IR illumination module 38 and the IR bandpass filter on the IR camera module 40 of the rack leg imaging module system 28 respectively associated with the plurality of illuminators 306 and the camera 304 of the rack leg imaging module 300 operate to permit most of the external lighting extraneous to image capture, such as warehouse lighting, to be ignored and filtered out of the image 450. Further, in embodiments where the rack legs 408 are unpainted, are light in color, and/or have a glossy paint coating, a widely spaced vertical array of the plurality of illuminators 306 may operate to mitigate the specular reflective nature of rack legs 408 to detect a rack leg 408 in an image 450. A process of illuminating a rack leg 408 through the plurality of illuminators 306 for image captured by the camera 304 of the rack leg imaging module 300 may include illumination of a large vertical area of the rack leg 408 to generate a large vertical field of view for the camera 304 due to a short range of the camera 304 to the rack 400 to capture a large area of the rack leg 408 in the image 450. Further, the rack legs 408 of the rack 400 may include highly reflective material, and a distributed light source as provided by the plurality of illuminators 306 of the rack leg imaging module 300 is configured to mitigate the high reflective nature of the rack leg 408 to provide a sharp and reliable image 450 of a detected rack leg 408.

In the process 600, the odometry-based position of the materials handling vehicle 102 is compared with the expected position of the materials handling vehicle 102. In block 612, an odometry error signal is generated based on a difference between the expected position and the odometry-based position. In embodiments indicative of a match between the expected position and the odometry-based position, the odometry error signal may be zero. In block 614, the odometry-based position of the materials handling vehicle 102 is updated using the odometry error signal.

Thus, the detected rack leg 408 is used to update a position of the materials handling vehicle 102. Each frame is processed to detect a rack leg 408 and, when the rack leg 408 is detected, the frame is processed by a processor 502 of the system 500 to accurately update the position of the materials handling vehicle 102 to prevent accumulated error of odometry data from the estimated maintained position of the materials handling vehicle 102 based on the odometry module 29 from growing at an unbounded rate. The vehicle control architecture is configured to navigate the materials handling vehicle 102 along the inventory transit surface 106 using the updated odometry-based position. In embodiments, the vehicle control architecture is configured to track the navigation of the materials handling vehicle 102 along the inventory transit surface 106 of the racking system aisle 70', navigate the materials handling vehicle 102 along the inventory transit surface 106 in at least a partially automated manner, or both, using the updated odometry-based position.

In embodiments, through use of detection of rack legs 408 in a given racking system aisle 70' to initialize, maintain, and update a position of the materials handling vehicle 102 in the given racking system aisle 70' as described herein through the rack leg imaging module 300, commissioning of a system 500 to utilize the rack leg imaging module 300 involves simple installation and commission. For example, the system 500 may only require aisle entry identifiers 302 such as QR code stickers to be placed at the entrances of each racking system aisle 70'. Further, the system 500 involves a simplified commissioning as information for the aisle entry identifier 302 is measured on site, input into a mobile computer, and printed on a mobile sticker printer to generate a mobile sticker with a unique QR code to be placed on an associated first rack leg 408 for each racking system aisle entrance in the warehouse 11. Thus, warehouse specific information does not need to be stored on any materials handling vehicle 102 for the system 500 as described herein to operate, resulting in a reduction in commissioning time over systems in which such warehouse specific information is required to be stored on the materials handling vehicle 102. Further, a close, predictable spacing of rack legs 408 in a given racking system aisle 70' relaxes requirements on the accuracy of the odometry module 29 as there is less accumulation of encoder error between closely spaced, predicable features of the rack legs 408 than there might otherwise be for a system including further spaced and manually placed global features, such as RFID tags in a warehouse floor.

The embodiments and systems described herein permit determination and accurate maintenance of a position of a materials handling vehicle 102 with positional accuracy in a racking system aisle 70' of the warehouse 11. Indeed, a combination of use of aisle entry identifiers 302 such as QR codes for position initialization of a materials handling vehicle 102 at aisle entrances and subsequent use of existing, regularly spaced features of rack legs 408 for a given racking system aisle 70' to maintain an accurate position of the materials handling vehicle 102 along the racking system aisle 70' permits not requiring use of a QR code on each rack leg 408 to maintain and update vehicle position of a materials handling vehicle 102 along the given racking system aisle 70'. For example, a given rack 400 for a racking system aisle 70' may be over a hundred meters long and may have over 40 rack legs 408.

Figure 7:
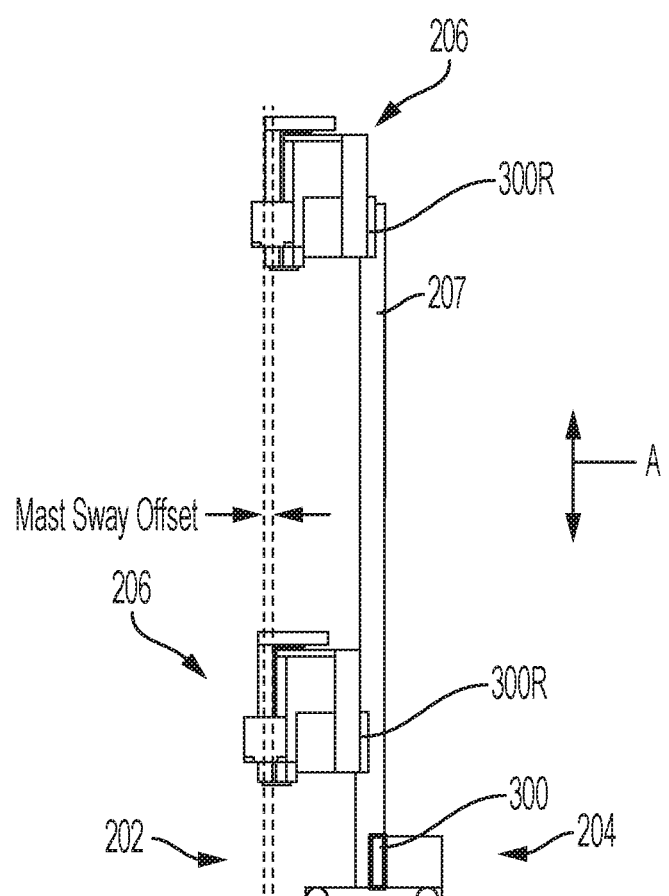
FIG. 7 depicts a schematic illustration of a materials handling vehicle including a raisable fork carriage assembly with the rack leg imaging module of FIG. 2 and illustrating a mast sway offset between fork carriage assembly positions, according to one or more embodiments shown and described herein.

Referring to FIG. 7, the vehicle 102 includes the fork carriage assembly 206 as a raisable assembly shown in a lower position on the mast assembly 207 and an upper, elevated position on the mast assembly 207. A mast sway offset of the position of the mast assembly 207 with respect to a center of the vehicle 102 along a vertical plane is shown between the lower position and the upper, elevated position. The mast sway offset of FIG. 7 is shown such that a first, left vertical plane intersecting an interior portion of the fork carriage assembly 206 in the lower position, such as a fork slot, does not intersect the interior portion in the upper, elevated position. Rather, a second, right vertical plane intersects the interior portion in the upper, elevated position. The horizontal distance between the first, left vertical plane, and the second, right vertical plane is indicative of the mast sway offset. The horizontal distance indicative of mast sway offset is further, in FIG. 7, indicative of fork displacement due to mast sway, and the rack leg imaging module 300R has a similar displacement as the fork displacement and mast sway offset.

The fork carriage assembly 206 on the fork side 202 includes the rack leg imaging module 300R as described above as the rack leg imaging module 300, though labeled with an R to indicate a raisable aspect. The rack leg imaging module 300R is placed on the fork carriage assembly 206 at a position to approximate a height of the forks. Thus, a vertical distance between the forks and an inventory transit surface may be determined based on the rack leg imaging module. As described in greater detail below, the horizontal distance indicative of the mast sway offset and the vertical distance between the fork and the inventory transit surface may be used to determine a mast sway offset compensation with respect to the vehicle 102.

In an embodiment, a position of a fork slot of the vehicle 102 or another target location of the vehicle 102 as the interior portion level with the rack leg imaging module 300R may be recorded at a set distance away from a center of the vehicle 102 in a lowest position of the fork carriage assembly 206. However, as the fork carriage assembly 206 rises, the position of the fork slot and/or the interior portion may change with respect to the center of the vehicle 102 due to a mast sway offset. Thus, calculations based on the recorded set distance between fork slot and/or the interior portion and the center of the vehicle 102 may be in error by the amount of the mast sway offset.

In embodiments, at least one rack leg imaging module 300R will be attached to the fork carriage assembly 206 at a height that approximates a fork height while having an obstructing view to racking. Rack legs detected by this rack leg imaging module 300R as described herein may compensate for mast sway through a determination of mast sway offset as described in greater detail below with respect to FIG. 11. A position output of the vehicle 102 with the mast sway compensation may thus be determined by the rack leg imaging module 300R. A second rack leg imaging module 300 may be configured to read a QR code as described herein and may be disposed on the power unit side 204 at a lower, fixed position on the vehicle 102. The second rack leg imaging module 300 at the lower position may ensure that the QR codes are observed and may provide redundancy to permit the system to reject false positive detections.

The rack leg imaging module 300R and the second rack leg imaging module 300 may be placed on different positions of the vehicle 102 in different embodiments, as shown in FIGS. 8A-8E, which show a perspective from the power unit side 204 toward the fork side 202.

Figure 8A:
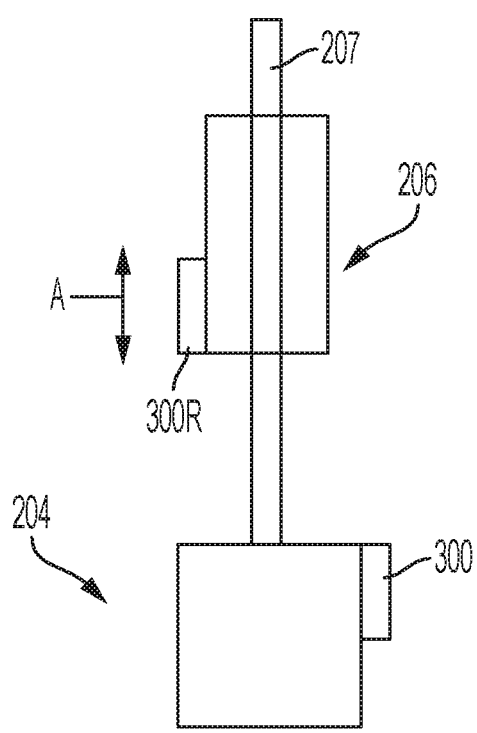
FIG. 8A depicts a schematic illustration of the materials handling vehicle in FIG. 7 in a first embodiment including the rack leg imaging module on the raisable fork carriage assembly on a first side of the materials handling vehicle and a lower, fixed rack leg imaging module on a second side opposite the first side of the materials handling vehicle.
Figure 8B:
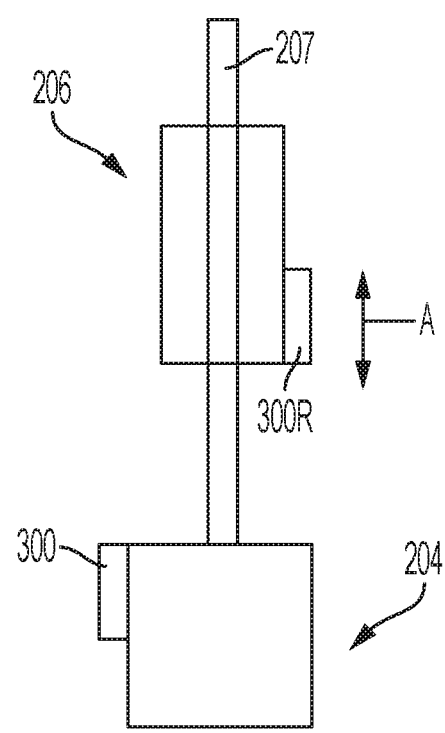
FIG. 8B depicts a schematic illustration of the materials handling vehicle in FIG. 7 in a second embodiment including the rack leg imaging module on the raisable fork carriage assembly on the second side of the materials handling vehicle and the lower, fixed rack leg imaging module on the first side of the materials handling vehicle.

FIGS. 8A-8B depict embodiments in which the rack leg imaging module 300R and the rack leg imaging module 300 are disposed on opposite sides of the vehicle 102. FIG. 8A shows a first embodiment including the rack leg imaging module 300R on the fork carriage assembly 206 on a first side of the vehicle 102 and a lower, fixed rack leg imaging module 300 fixed to the vehicle 102 on the power unit side 204 on a second side opposite the first side of the vehicle 102. The fork carriage assembly 206 is raisable with respect to the mast assembly 207 along a direction of arrow A such that the rack leg imaging module 300R is configured to move along the direction of arrow A. FIG. 8B depicts a second embodiment including the rack leg imaging module 300R on the fork carriage assembly 206 on the second side of the vehicle 102 and the lower, fixed rack leg imaging module 300 fixed to the vehicle 102 on the power unit side 204 on the first side of the vehicle 102. The raised rack leg imaging module 300R is configured to provide position output of the vehicle 102 while the second rack leg imaging module 300 is configured to initialize vehicle position through reading of a QR code as described herein. The second rack leg imaging module 300 is further configured to generate a position of rack leg imaging module 300 that matches a position of the rack leg imaging module 300R within a predetermined threshold. Failure to match the positions within the predetermined threshold may cause the rack leg imaging module 300R to error out and the vehicle 102 to take an action, such as to halt or slow pending operator override.

Figures 8C, 8D:
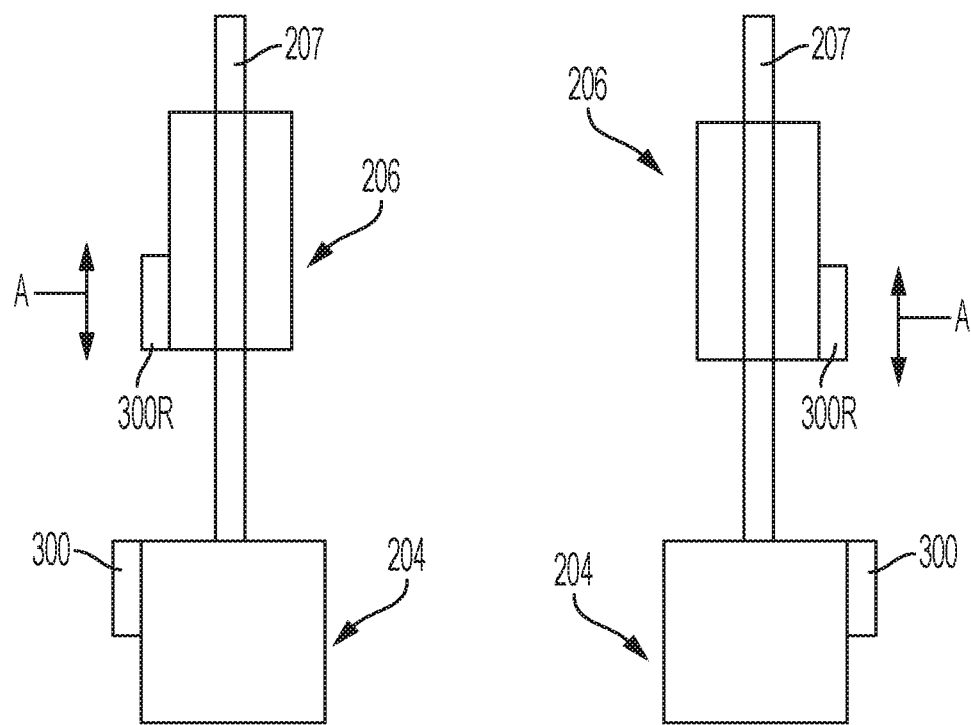
FIG. 8C depicts a schematic illustration of the materials handling vehicle in FIG. 7 in a third embodiment including the rack leg imaging module on the raisable fork carriage assembly on the first side of the materials handling vehicle and the lower, fixed rack leg imaging module on the first side of the materials handling vehicle.
FIG. 8D depicts a schematic illustration of the materials handling vehicle in FIG. 7 in a fourth embodiment including the rack leg imaging module on the raisable fork carriage assembly on the second side of the materials handling vehicle and the lower, fixed rack leg imaging module on the second side of the materials handling vehicle.

FIGS. 8C-8D depict embodiments in which the rack leg imaging module 300R and the rack leg imaging module 300 are disposed on the same side of the vehicle 102. In FIG. 8C, the rack leg imaging module 300R is disposed on the fork carriage assembly 206 on the first side of the vehicle 102 and the lower, fixed rack leg imaging module 300 is fixed to the vehicle 102 on the power unit side 204 on the first side of the vehicle 102. In FIG. 8D, the rack leg imaging module 300R is disposed on the fork carriage assembly 206 on the second side of the vehicle 102 and the lower, fixed rack leg imaging module 300 is fixed to the vehicle 102 on the power unit side 204 on the second side of the vehicle 102.

In embodiments in which an aisle only has a single side of racking, the lower, fixed rack leg imaging module 300 may be the module relied upon to determine a position output for the vehicle 102 through a position of the rack leg imaging module 300 generated as described herein. Alternatively, the rack leg imaging module 300R if on the same side of the single side of racking may be used to determine a position output for the vehicle 102 through a position of the rack leg imaging module 300R generated as described herein.

Figure 8E:
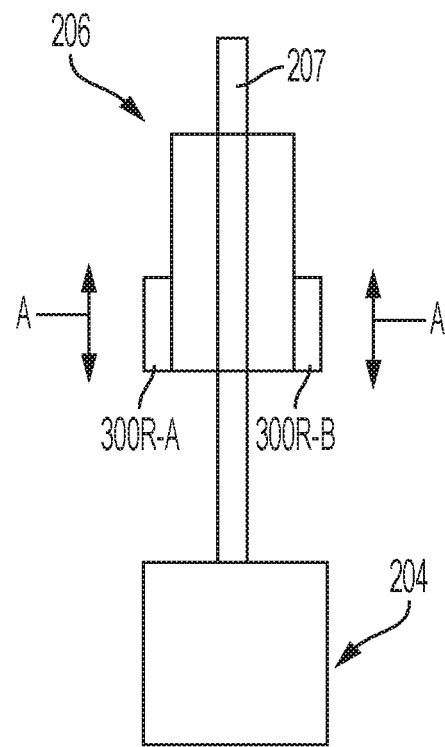
FIG. 8E depicts a schematic illustration of the materials handling vehicle in FIG. 7 in a fifth embodiment including the rack leg imaging module on the raisable fork carriage assembly on the first side of the materials handling vehicle and another rack leg imaging module on the raisable fork carriage assembly on the second side of the materials handling vehicle.
Figure 8F:
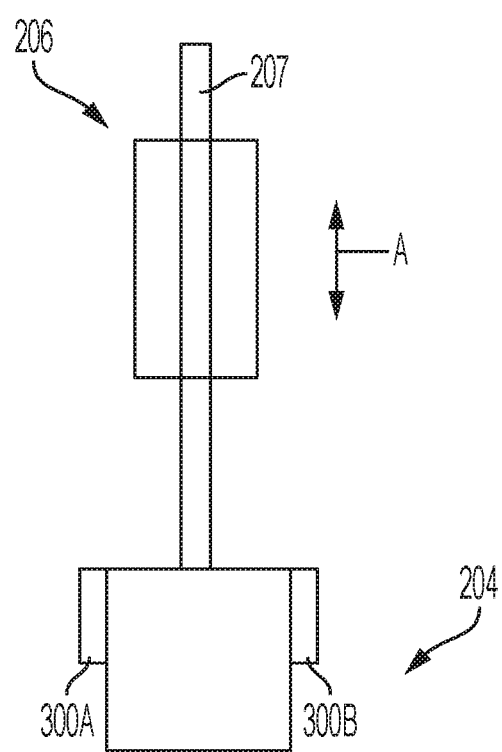
FIG. 8F depicts a schematic illustration of a materials handling vehicle in an embodiment including a fixed rack leg imaging module on a power unit assembly on the first side of the materials handling vehicle and another fixed rack leg imaging module on the power unit assembly on the second side of the materials handling vehicle, according to one or more embodiments shown and described herein.

FIGS. 8E-8F show a perspective of the materials handling vehicle 102 from the power unit side 204 toward the fork side 202. In FIG. 8E, a first rack leg imaging module 300R-A on the fork carriage assembly 206 is disposed on the first side of the materials handling vehicle 102 and another, second rack leg imaging module 300R-B is disposed on the fork carriage assembly 206 on the second side of the materials handling vehicle 102.

Referring to FIG. 8E, the materials handling vehicle 102 may include a raisable rack leg imaging module 300R-A on the fork carriage assembly 206 on a first side of the vehicle 102 and another raisable rack leg imaging module 300R-B on the fork carriage assembly 206 on a second side opposite the first side of the vehicle 102. In such an embodiment in which both rack leg imaging modules 300R-A and 300R-B disposed on the vehicle 102 as raisable with the fork carriage assembly 206, the fork carriage assembly 206 is to be maintained at a height sufficient to read a QR code upon entering an aisle. Position output may be determined based on the one of rack leg imaging modules 300R-A, 300R-B that is on the same side as a target pallet location in the aisle.

Referring to FIG. 8F, the vehicle 102 may include a fixed position rack leg imaging 300A on a power unit assembly of the power unit side 204 on a first side of the vehicle 102 and another fixed rack leg imaging module 300B on the power unit assembly on a second side opposite the first side of the vehicle 102.

Figure 9:
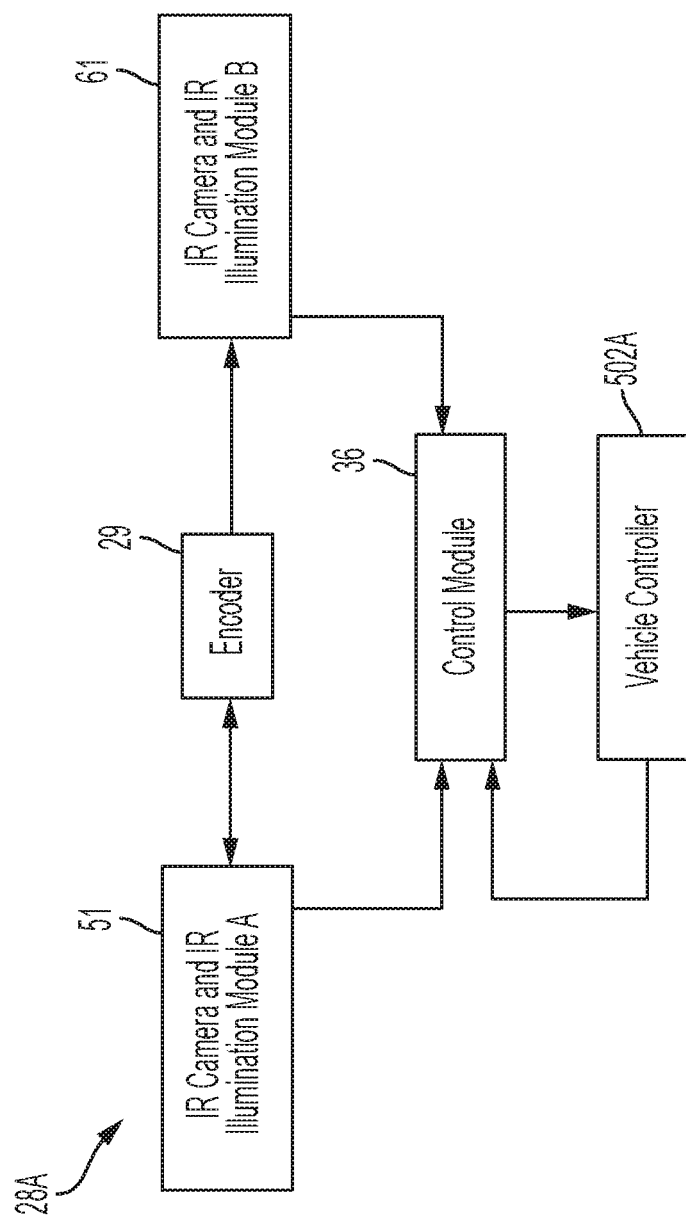
FIG. 9 depicts a schematic illustration of another embodiment of the rack leg imaging module system of FIG. 4 including a pair of rack leg imaging modules and a control module.

Referring to FIG. 9, a rack leg imaging module system 28A is illustrated in an embodiment including a pair of rack leg imaging modules 300, 300R, 300R-A, and/or 300 R-B and a control module 36. In particular, the rack leg imaging module system 28A includes an IR Camera and IR Illumination Module A 51 and an IR Camera and IR Illumination Module B 61 that operate similar to IR Camera and IR Illumination Module 41 described above with respect to FIG. 5. The two rack leg imaging module system of FIG. 9 includes the IR Camera and IR Illumination Module A 51 and the IR Camera and IR Illumination Module B 61 that are communicatively coupled to the control module 36 and the encoder 29.

The encoder 29 may be a drive wheel encoder or a load wheel encoder of the vehicle 102. The drive wheel encoder of the vehicle 102 may be associated with wheels of the vehicle 102 that move the vehicle 102 on the inventory transit surface and may be powered by a vehicle motor. The load wheel encoder may be an encoder associated with the wheel disposed near the fork carriage assembly 206 that follow the motion of the vehicle 102 and provide for less slip. The encoder 29, such as when a load wheel encoder, may be powered by a single one of the modules 51, 61. In FIG. 9, the encoder 29 as a load wheel encoder may be powered by the IR Camera and IR Illumination Module 51. The encoder 29 provides encoder/quadrature data to the modules 51, 61. The modules 51, 61 generate and output image information sent to the control module 36 that, along with tick information as distances between racks, generates a position of the vehicle 102 as described herein based on the images and tick information. The control module 36 is communicatively coupled to a vehicle controller 502A, such as a vehicle control area network bus ("CAN bus") controller. The CAN bus controller incorporates a robust vehicle bus standard to allow microcontrollers and vehicle devices to communicate within the vehicle systems without a host computer. The CAN bus controller incorporates a message-based protocol that cooperates with multiplex electrical wiring within the vehicle 102. Further, the CAN bus controller is configured to permit interaction between various vehicle systems to allow for a wide range of functionality and control through use of software rather than hard wiring between such systems. By way of example, and not as a limitation, a vehicle subsystem may control actuators or receive feedback from sensors through the CAN bus controller to control a vehicle functionality. The CAN bus is configured to collate various sensor inputs from one or more different vehicle subsystems as needed to determine whether to enact a vehicle functionality of the vehicle subsystem based on those sensor inputs.

The vehicle controller 502A is configured to send vehicle information such as a steer wheel angle, a steer wheel speed, and a wire guidance state to the control module 36, which generates a position of the vehicle 102 based on the received vehicle information, images, and tick information and sends the position of the vehicle 102 to the vehicle controller 502A. If a failure message is triggered in the control module 36, such as when a position generated based on the IR Camera and IR Illumination Module A 51 is outside of a predetermined threshold when compared to a position generated based on the IR Camera and IR Illumination Module B 61, the failure message is sent to the vehicle controller 502A.

Figure 10:
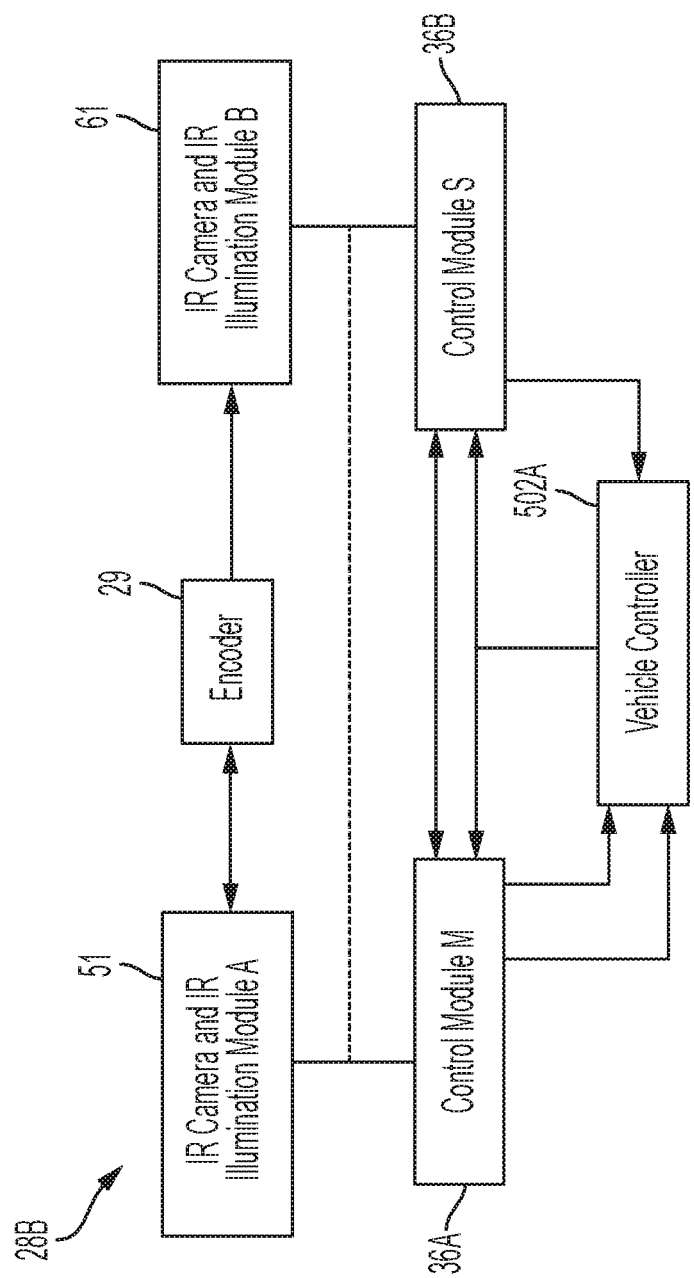
FIG. 10 depicts a schematic illustration of yet another embodiment of the rack leg imaging module system of FIG. 4 including a position of rack leg imaging modules and a pair of control modules.

Referring to FIG. 10, a rack leg imaging module system 28B is illustrated in an embodiment including a pair of rack leg imaging modules 300, 300R, 300R-A, and/or 300 R-B and a pair of control modules 36A, 36B. In particular, the rack leg imaging module system 28B includes an IR Camera and IR Illumination Module A 51 and an IR Camera and IR Illumination Module B 61 that operate similar to IR Camera and IR Illumination Module 41 described above with respect to FIG. 5. The two rack leg imaging module system of FIG. 10 includes the IR Camera and IR Illumination Module A 51 and the IR Camera and IR Illumination Module B 61 that are communicatively coupled to a pair of control modules 36A, 36B and the encoder 29. The control modules 36A, 36B are communicatively coupled to the vehicle controller 502A. The modules 51, 61, the encoder 29, and the vehicle controller 502A operate as described above with respect to FIG. 9.

The control module M 36A is shown as a master control module, and the control module S 36B is shown as a slave control module. In an embodiment in which an aisle only includes a single side of racking, both control modules 36A, 36B may be used with the same one of the IR Camera and IR Illumination Module A 51 or the IR Camera and IR Illumination Module B 61 as indicated by the dashed line in FIG. 10. Only the control module M 36A as the master control module will generate a position of the vehicle 102 to send to the vehicle controller 502A.

The modules 51, 61 generate and output image information sent respectively to the control modules 36A, 36B that, along with tick information as distances between racks, generates a position of the vehicle 102 as described herein based on the images and tick information. The positions of the vehicle 102 from each of the control modules 36A, 36B may be received in each of the control modules 36A, 36B, processed, and compared to determine if the positions are within a predetermined tolerance of one another to be valid positions.

The positions of the vehicle 102 may be further generated based on information received from the vehicle controller 502A. A resulting vehicle position generated by the control module M 36A as the master control module may be sent to the vehicle controller 502A. Both the control module M 36A and the control module S 36B may send failure messages to the vehicle controller 502A, such as if the generated positions are not within a predetermined tolerance of one another and are determined to be invalid positions.

Mast Sway Compensation

Figure 11:
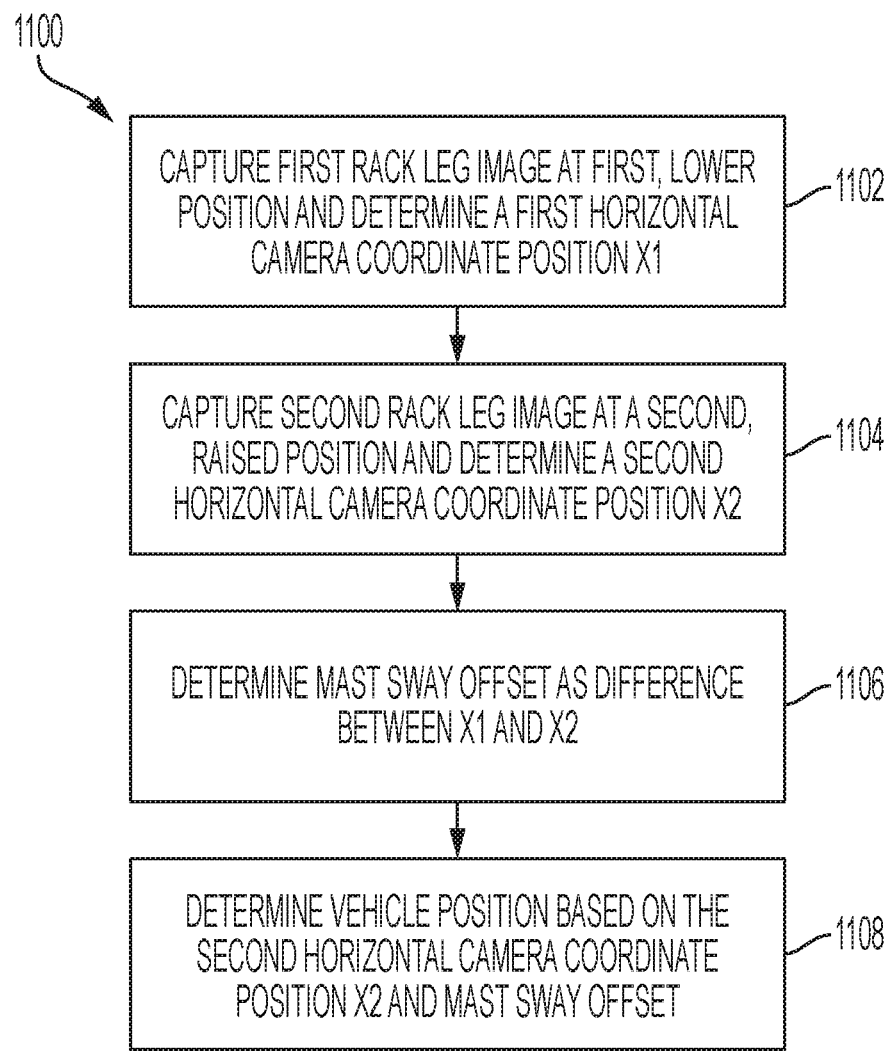
FIG. 11 depicts a flowchart overview of a method for a mast sway offset compensation, according to one or more embodiments shown and described herein.

Referring to FIG. 11, a mast sway offset compensation method 1100 is shown that may use the rack leg imaging module 300R, 300R-A, and/or 300R-B of FIGS. 8A-8E and a position module feedback system of FIG. 5, FIG. 9, or FIG. 10. While the rack leg imaging module 300R is referenced below, it is to be understood that any of the rack leg imaging modules 300R, 300R-A, and/or 300R-B disposed on and raisable through the fork carriage assembly 206 may operate to be used by the mast sway offset compensation method 1100.

In an embodiment, the method 1100 may be used for localizing a materials handling vehicle 102 comprising a camera 304, a mast assembly 207, a mast assembly control unit, a fork carriage assembly 206, a vehicle position processor, and a drive mechanism configured to move the materials handling vehicle along an inventory transit surface of a warehouse 11. The mast assembly 207 and the mast assembly control unit may be configured to move the fork carriage assembly along a vertical lift axis. The camera 304 may be secured to the fork carriage assembly 206. The camera 304 may be secured directly or indirectly to the fork carriage assembly. The camera 304 is configured to capture (i) a forks down image of at least a portion of a rack leg 408 positioned in a racking system aisle 70' of the multilevel warehouse racking system 12, and (ii) a forks-up image of at least a portion of a rack leg 408 positioned in a racking system aisle 70' of the multilevel warehouse racking system 12.

"Forks-up" and "forks-down" are relative terms and generally denote carriage positions that are respectively higher and lower than the other. Generally, a "forks-up" image will be an image taken by the camera when the carriage has raised the forks to a position to pick or place items from an elevated storage position in a multilevel warehouse racking system, while a "forks-down" image will be an image taken by the camera when the forks are at or near floor level. It is contemplated, however, that any pair of carriage positions where one carriage position is higher than the other will define positions where a "forks-up" image and a "forks-down" image may be acquired.

The method 1100 includes, via the vehicle position processor, generating a forks-down coordinate X1 of the camera 304 along a horizontal axis from the forks-down image of the rack leg 408. In block 1102, one or more first rack leg images is captured at a first, lower position as shown in FIG. 7 by the rack leg imaging module 300R as described herein. A forks-down coordinate X1 is determined based on the one or more first rack leg images. In an embodiment, a stored set distance between the rack leg imaging module 300R on the fork carriage assembly 206 as a center of the materials handling vehicle 102 may be stored in the control module 36. The forks-down coordinate X1 may be used to generate a position of the rack leg imaging module 300R and may further utilize the stored set distance to generate a position of the center of the materials handling vehicle 102 based on the position of the rack leg imaging module 300R. A generated position of the vehicle 102 may be the generated position of the center of the materials handling vehicle 102 based on the position of the rack leg imaging module 300R and the set distance. The position of the rack leg imaging module 300R is generated based on the one or more first rack images and the stored set distance as a position of the camera 304 with reference to the center of the materials handling vehicle 102. As the optical center of camera 304 adjusts as the rack leg imaging module 300R raises along the mast assembly 207 to a raised position, the stored set distance is no longer an accurate distance to utilize. Rather, an offset of the optical center of the camera 304 with respect to the center of the vehicle 102 in the raised position needs to be determined and applied to the stored set distance for accuracy, which offset corresponds to a mast sway offset as described below.

The method 1100 includes generating a forks-up coordinate X2 of the camera 304 along a horizontal axis from a forks-up image of the rack leg 408 captured with the fork carriage assembly 206 at a lift height H1. In block 1104, one or more second rack leg images is captured at a second, raised position with respect to the first, lower position as shown in FIG. 7 by the rack leg imaging module 300R. A forks-up coordinate X2 is determined based on the one or more second rack leg images. The forks-up coordinate X2 may be used to generate a position of the rack leg imaging module 300R and may further utilize the stored set distance to generate a position of the center of the materials handling vehicle 102 based on the position of the rack leg imaging module 300R. However, at an elevated position, the distance between the rack leg imaging module 300R and the center of the materials handling vehicle 102 may change from the set distance that is stored due to mast sway of the mast assembly 207.

The method 1100 further includes determining a mast sway offset as a difference between the forks-down coordinate X1 and the forks-up coordinate X2. In block 1106, for mast sway compensation, a mast sway offset is determined based on a difference between the forks-down coordinate X1 and the forks-up coordinate X2. This difference is associated with the change of distance from the set distance that is stored due to mast sway of the mast assembly 207. Additional calculations may be an offset angle between the original set distance and a mast sway distance using the forks-down coordinate X1 and the forks-up coordinate X2 and determined vertical distances of the fork carriage assembly 206 with respect to inventory transit surface. The mast sway offset may further be determined based on the offset angle. The forks of the vehicle 102 may also reference the center of the vehicle 102, such that a set fork distance to the vehicle center is stored. As the rack leg imaging module 300R is disposed on the fork carriage assembly 206 may be in alignment with the forks, fork displacement with respect to the center of the vehicle 102 may also be determined through determination of the mast sway offset as described herein.

The method 1100 includes determining a horizontally advanced position of the materials handling vehicle 102 with the fork carriage assembly 206 at the lift height H1 using the mast sway offset and a subsequently captured forks-up image of at least a portion of a rack leg 408 positioned in the racking system aisle 70'. In block 1108, a position of the materials handling vehicle 102 is determined based on the forks-up coordinate X2 and the mast sway offset. The forks-up coordinate X2 may be used to generate a position of the rack leg imaging module 300R and may further utilize the stored set distance compensated by the mast sway offset to generate a position of the center of the materials handling vehicle 102 based on the position of the rack leg imaging module 300R. Thus, even though at the elevated position the distance between the rack leg imaging module 300R and the center of the vehicle 102 may change from the set distance that is stored due to mast sway of the mast assembly 207, the mast sway offset compensates for such a change. The mast sway offset thus compensates for potential mast sway when determining a position of the materials handling vehicle 102 with the rack leg imaging module 300R in an elevated position on the mast assembly 207.

The camera 304 may be further configured to capture an image of an aisle entry identifier 302 in a multilevel warehouse racking system 12. In an embodiment, the vehicle position processor may be further configured to generate aisle-specific rack leg spacing data from an image of an aisle entry identifier 302, as captured by the camera 304, and determine the horizontally advanced position of the materials handling vehicle 102 with the fork carriage assembly 206 at the lift height H1 using the aisle-specific rack leg spacing data in addition to the mast sway offset and the subsequently captured forks-up image.

Alternatively or additionally, the vehicle position processor may be configured to generate end-of-aisle positional data and aisle-specific rack leg spacing data from an image of an aisle entry identifier 302, as captured by the camera, generate an initial position of the materials handling vehicle 102 along the inventory transit surface using the end-of-aisle positional data, generate an expected position of the materials handling vehicle 102 as the vehicle travels down a racking system aisle corresponding to the aisle entry identifier from the end-of-aisle positional data, the aisle-specific rack leg spacing data, and a forks-down image of at least a portion of a rack leg positioned in the racking system aisle. The vehicle position processor may be further configured to update the expected position of the materials handling vehicle as the vehicle travels down the racking system aisle using the mast sway offset and the subsequently captured forks-up image of at least a portion of a rack leg positioned in the racking system aisle. The aisle entry identifier 302 may be disposed on an end rack leg 408 of the racking system aisle 70'.

Further, the camera 304 may be configured to capture an image of an aisle end identifier 302 in a multilevel warehouse racking system 12. The aisle end identifier 302 as described herein may be disposed on an aisle end rack leg 408, which may be an end rack leg 408 of the racking system aisle 70'. As will be described in greater detail below regarding end of aisle protection and methods 1200-1300 of FIGS. 12-13, respectively, the vehicle position processor may further be configured to generate end-of-aisle limit data comprising an end-of-aisle limit from an image of an aisle end identifier 302, as captured by the camera 304, determine whether the materials handling vehicle 102 exceeds the end-of-aisle limit, transmit a limit-based command to the drive mechanism of the materials handling vehicle 102 when an operating state of the materials handling vehicle 102 exceeds the end-of-aisle limit, initiate a vehicle action based on the limit-based command, the vehicle action configured to modify operation of the materials handling vehicle 102 to a modified operating state within the end-of-aisle limit, and navigate the materials handling vehicle 102 to exit the racking system aisle in the modified operating state. The aisle end identifier 302 may be disposed on an aisle end rack leg 408. The end-of-aisle limit may include a speed limit, a lift height limit, an acceleration limit, a deceleration limit, a lift acceleration limit, a lift deceleration limit, or combinations thereof. The vehicle position processor may be configured to navigate the materials handling vehicle 102 outside of the racking system aisle 70' in the modified operating state, in an additional operating state that is within or outside of the end-of-aisle limit, or in a combination of operating states selected therefrom.

In another end of aisle protection embodiment, the camera 304 is configured to capture an image of an aisle entry identifier 302 in a multilevel warehouse racking system 12. The vehicle position processor may be configured to generate end-of-aisle limit data comprising an end-of-aisle limit, end-of-aisle positional data, and aisle-specific rack leg spacing data from an image of an aisle entry identifier, as captured by the camera 304, generate an initial position of the materials handling vehicle 102 along the inventory transit surface 106 using the end-of-aisle positional data, and generate an expected position of the materials handling vehicle as the vehicle travels down a racking system aisle corresponding to the aisle entry identifier from the end-of-aisle positional data, the aisle-specific rack leg spacing data, and the horizontally advanced position. The vehicle position processor may further be configured to determine whether the operating state of the materials handling vehicle 102 exceeds the end-of-aisle limit when the expected position of the materials handling vehicle corresponds to an end of the racking system aisle, transmit a limit-based command to the drive mechanism of the materials handling vehicle when the operating state of the materials handling vehicle 102 exceeds the end-of-aisle limit, initiate a vehicle action based on the limit-based command, the vehicle action configured to modify operation of the materials handling vehicle 102 to a modified operating state within the end-of-aisle limit, and navigate the materials handling vehicle 102 to exit the racking system aisle 70' in the modified operating state. The vehicle position processor may be further configured to generate the expected position of the materials handling vehicle 102 from an image of at least a portion of a rack leg 408 positioned in the racking system aisle 70'.

As will be described in greater detail below regarding out of aisle localization and methods 1400-1500 of FIGS. 14-15, respectively, the vehicle position processor may further be configured to generate end-of-aisle positional data and aisle-specific rack leg spacing data from an image of an aisle entry identifier 302, as captured by the camera 304, and generate an initial position of the materials handling vehicle 102 along the inventory transit surface 106 using the end-of-aisle positional data, generate an expected position of the materials handling vehicle 102 as the vehicle travels down a racking system aisle corresponding to the aisle entry identifier 302 from the end-of-aisle positional data, the aisle-specific rack leg spacing data, and the horizontally advanced position. In an embodiment, the horizontally advanced position of the materials handling vehicle 102 with the fork carriage assembly 206 at the lift height H1 may be determined using aisle-specific rack leg spacing data in addition to the mast sway offset and a subsequently captured forks-up image of at least a portion of a rack leg 408 positioned in the racking system aisle 70', and the expected position may be updated using the horizontally advanced position. The vehicle position processor may be configured to navigate the materials handling vehicle 102 to exit the racking system aisle 70', and update the expected position of the materials handling vehicle 102 using a dead reckoning component of the materials handling vehicle 102 when the materials handling vehicle 102 is outside of the racking system aisle 70'.

In an additional or alternative embodiment, the camera 304 is configured to capture images comprising an aisle exit identifier 302 for a racking system aisle 70' of a multilevel warehouse racking system 12, and the vehicle position processor is configured to generate end-of-aisle positional data from an image of an aisle exit identifier 302, as captured by the camera 304, generate a vehicle pose of the materials handling vehicle 102 relative to the aisle exit identifier 302 using the end-of-aisle positional data, and generate an inventory transit surface position of the materials handling vehicle 102 along the inventory transit surface 106 using the end-of-aisle positional data, the vehicle pose, and the horizontally advanced position. The vehicle position processor may further be configured to navigate the materials handing vehicle 102 to exit the racking system aisle 70', and update the inventory transit surface position of the materials handling vehicle 102 using a tag identifier component of the materials handling vehicle 102 when the materials handling vehicle 102 is outside of the racking system aisle. Out-of-aisle positional data may be generated from a tag identifier 71, as received by the tag identifier component, and the vehicle pose of the materials handling vehicle 102 relative to the tag identifier 71 may be updated using the out-of-aisle positional data.

End of Aisle Protection

Figure 12:
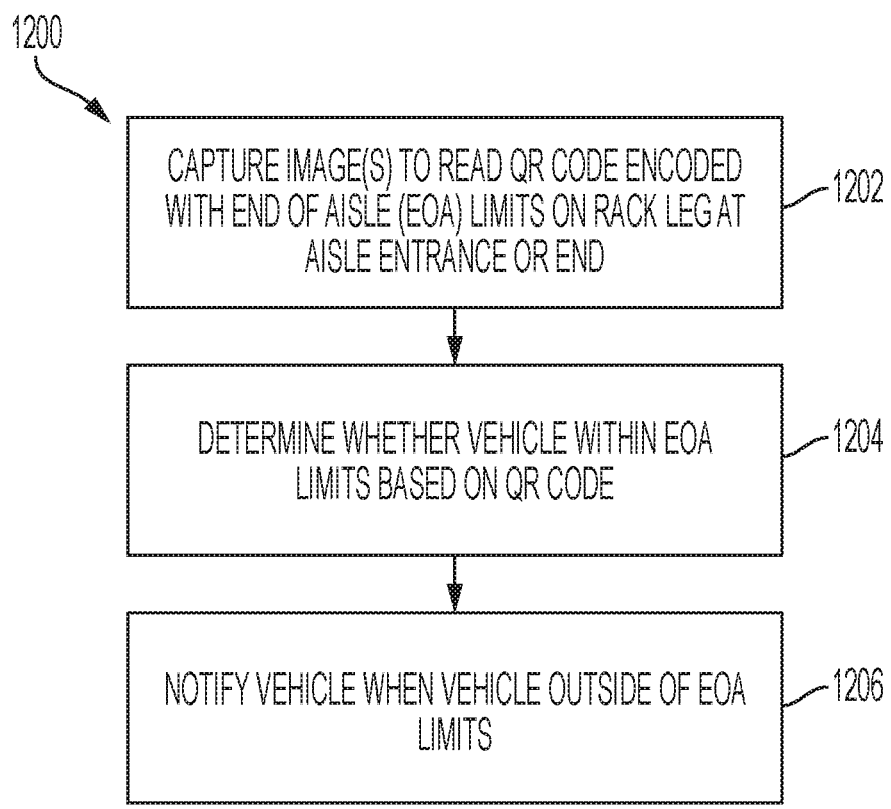
FIG. 12 depicts a flowchart overview of a vehicle end of aisle limit determination method, according to one or more embodiments shown and described herein.

Referring to FIG. 12, a vehicle end of aisle limit determination method 1200 is shown. In embodiments, end of aisle protection may limit speed of the vehicle 102 when the vehicle is first locked onto a guidance wire unless the vehicle 102 passes and reads an encoded QR code as described herein to indicate an end of aisle and information specific to that aisle and end of aisle, such as end of aisle limit information. The end of aisle limit information may cause the vehicle processor 502A to send a command to the vehicle 102, such as to protect the vehicle 102 when entering or leaving an aisle. The command may be, for example, to slow or halt the vehicle 102 or to enable the vehicle 102 to drive at a higher speed than a current vehicle speed.

With respect to the method 1200, for a materials handling vehicle 102 comprising a camera 304, a vehicle position processor, and a drive mechanism configured to move the materials handling vehicle along an inventory transit surface, the camera 304 may be configured to capture an image comprising an aisle end identifier 302 or an aisle entry identifier 302 for a racking system aisle 70' of a multilevel warehouse racking system 12. The vehicle position processor may be then configured to generate end-of-aisle limit data comprising an end-of-aisle limit from an image of an aisle end identifier 302 or an aisle entry identifier 302, as captured by the camera 304.

In block 1202, for instance, one or more images are captured by the camera 304 of the rack leg imaging module 300, 300A, 300B, 300R-A, and/or 300R-B as the camera 304 passes a QR code at an end of an aisle (e.g., an aisle entrance or end) as described herein. In an embodiment, a speed of the vehicle 102 may be limited when the vehicle 102 first locks onto a guidance wire until the rack leg imaging module 300, 300A, 300B, 300R-A, and/or 300R-B passes and reads the rack leg identifier 302 such as the QR code on a rack leg 408 as described herein at the end of an aisle. The QR code is configured to be encoded with one or more end of aisle limits for the aisle.

The method 1200 may further determine whether the materials handling vehicle exceeds the end-of-aisle limit. In block 1204, the method determines whether the vehicle 102 is within the one or more end of aisle limits for the aisle based on the QR code. The rack leg imaging system associated with the rack leg imaging 300 is configured to output at continuous or predetermined intervals whether the vehicle 102 is within the aisle limits or not during the navigation of the vehicle 102 through the aisle. Missed messages may be interpreted by a receiver of the vehicle 102 to be indicative of the vehicle 102 being outside of the aisle limit.

In an embodiment, responsive to capture of the image of the aisle entry identifier 302, an initial position is generated of the materials handling vehicle 102 along the inventory transit surface 106 using the end-of-aisle positional data, and an expected position is generated of the materials handling vehicle 102 as the vehicle 102 travels down the racking system aisle 70' corresponding to the aisle entry identifier from the end-of-aisle positional data and the aisle-specific rack leg spacing data. The vehicle position processor may be further configured to generate the expected position of the materials handling vehicle 102 from an image of at least a portion of a rack leg 408 positioned in the racking system aisle 70'. When the expected position of the materials handling vehicle corresponds to an end of the racking system aisle, the vehicle position processor may be configured to determine whether the operating state of the materials handling vehicle exceeds the end-of-aisle limit in block 1204. In an embodiment, the expected position of the materials handling vehicle 102 may be updated using a dead reckoning component of the materials handling vehicle 102 when the materials handling vehicle is outside of the racking system aisle 70, as described in greater detail below with respect to method 1400. In another embodiment, as described in greater detail below with respect to method 1500, a vehicle pose of the materials handling vehicle relative to the aisle exit identifier may be generated using the end-of-aisle positional data, an inventory transit surface position of the materials handling vehicle 102 along the inventory transit surface 106 may be generated using the end-of-aisle positional data, the vehicle pose, and the expected position and updated using a tag identifier component of the materials handling vehicle 102 when the materials handling vehicle 102 is outside of the racking system aisle 70'.

The method 1200 may further initiate a vehicle action based on the limit-based command, the vehicle action configured to modify operation of the materials handling vehicle 102 to a modified operating state within the end-of-aisle limit, and navigate the materials handling vehicle 102 to exit the racking system aisle 70' in the modified operating state. In block 1206, for instance, the vehicle 102 may be commanded to take an action when the vehicle 102 is outside of the one or more end of aisles. For example, such a determination that the vehicle 102 is outside of the aisle limit may cause the vehicle controller 502A to take an action to slow or to halt the vehicle 102.

Figure 13:
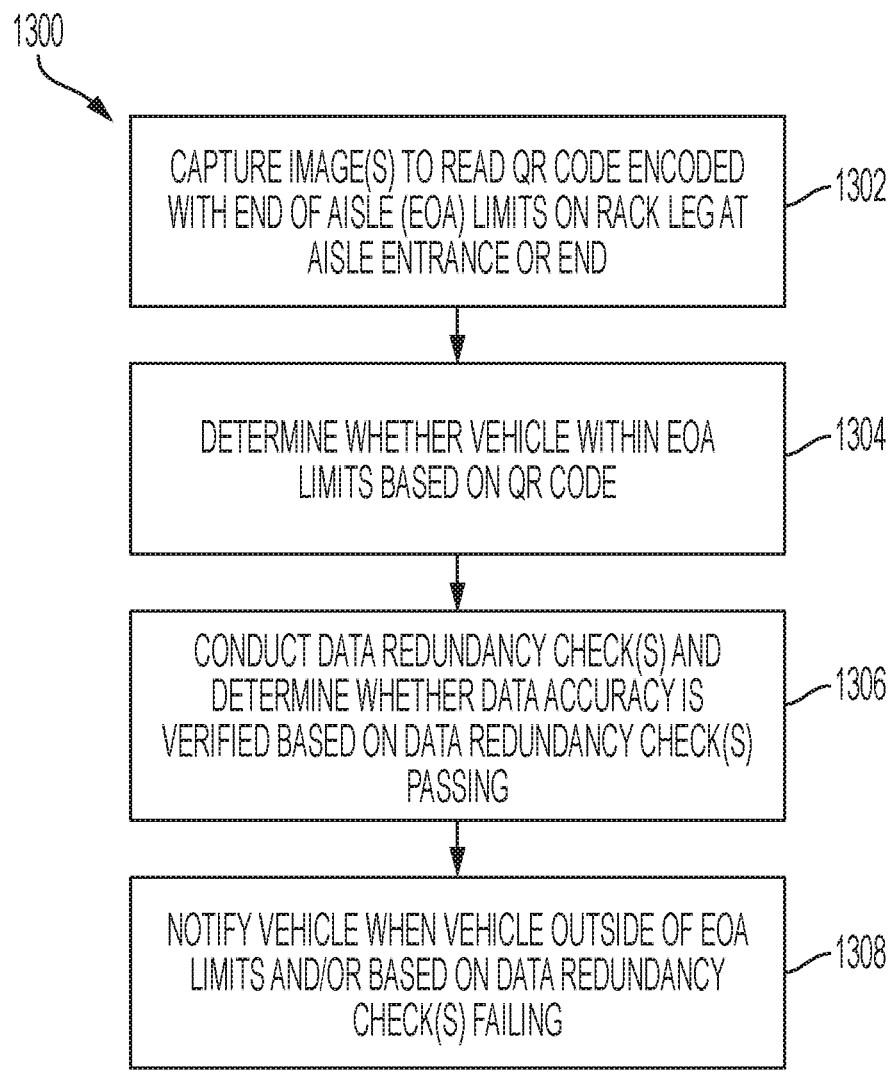
FIG. 13 depicts a flowchart overview of a vehicle end of aisle limit determination method based on data redundancy, according to one or more embodiments shown and described herein.

Referring to FIG. 13, another vehicle end of aisle limit determination method 1300 based on data redundancy is shown. The method 1300 is similar to the method 1200 except as otherwise noted herein. The methods 1200 or 1300 may further be combined with one or more steps of the methods 600, 1100, 1400, and/or 1500 as described herein. In block 1302, one or more images are captured by the camera 304 of the rack leg imaging module 300, 300A, 300B, 300R-A, and/or 300R-B as the camera 304 passes a QR code at an end of an aisle (e.g., an aisle entrance or end) as described herein. The rack leg imaging module 300, 300A, 300B, 300R-A, and/or 300R-B passes and reads the rack leg identifier 302 such as the QR code on a rack leg 408 as described herein at the end of the aisle, which QR code is configured to be encoded with one or more end of aisle limits for the aisle. In block 1304, similar to block 1204 of FIG. 12, the method determines whether the vehicle 102 is within the one or more end of aisle limits for the aisle based on the QR code.

Further, in block 1306, the method conducts one or more data redundancy checks. The method determines whether data accuracy of whether the vehicle 102 is within the one or more end of aisle limits is valid based on the passage of the one or more data redundancy checks. The one or more data redundancy checks add redundancy at each layer of the method employed to assist with providing a very low probability of failure during operation of the vehicle 102. The one or more data redundancy checks thus assist with maintaining an accurate and suitable performance level for the vehicle 102.

One of the data redundancy checks may include determining whether the correct end of aisle limit data associated with an aisle is being retrieved through sensing a pair of rack leg identifiers 302 that have the same data. As a non-limiting example, a rack leg 408 may include both a rack leg identifier 302 and a rack leg identifier 302A that include the same data. The rack leg identifiers 302, 302A may be vertically arranged QR codes disposed on the same rack leg 408 such that a camera 304 of a rack leg imaging module 300, 300A, 300B, 300R-A, and/or 300R-B is configured to pass and read the rack leg identifiers 302, 302A on the rack leg 408 as described herein. If the read rack leg identifiers 302, 302A do not include the same data, the redundancy check fails.

Another data redundancy check may include determining whether two sources of distance traveled odometry with respect to the vehicle 102 are within a tolerance of one another. By way of example, and not as a limitation, the encoder 29 may include both a drive wheel encoder and a load wheel encoder communicatively coupled to the vehicle 102. Odometry data from each of the drive wheel encoder and the load wheel encoder may be received and compared in the control module 36, 36A, and 36B and/or the vehicle controller 502A to determine whether the odometry data from each encoder is within a predetermined tolerance. If so, the redundancy check passes. If not, the redundancy check fails.

Yet another data redundancy check may include determining whether two cameras 304 on opposite sides of the vehicle 102, as shown in FIGS. 8E-8F, detect rack legs 408 within a tolerance of each other. As a non-limiting example, camera data from the rack leg imaging modules 300R-A, 300R-B (FIG. 8E) or from the rack leg imaging modules 300A, 300B (FIG. 8F) may be captured, received, and compared in the control module 36, 36A, and 36B and/or the vehicle controller 502A to determine whether the captured rack legs 408 are within a predetermined tolerance. If so, the redundancy check passes. If not, the redundancy check fails.

One other data redundancy check may include determining whether two control modules 36A, 36B generate respective position outputs as described herein that are within a tolerance of each other. The control modules 36A, 36B may operate as separate independent modules or as a master module 36A and a slave module 36B. Only one of control modules 36A, 36B may provide power to the encoder 29 when the encoder 29 is a load wheel encoder. As a non-limiting example, a position output from the control module M 36A of FIG. 10 may be compared with a position output of the control module S 36B of FIG. 10. The position output of each may come from the same or a different rack leg imaging module 300, 300A, 300B, 300R-A, and/or 300R-B. In an embodiment in which the aisle only includes a single side of racking, both control modules 36A, 36B may use the same camera source, as indicated by the dashed line in FIG. 10, and there is a lower tolerance for position jump indicative of a change in position between time steps. By way of example, and not as a limitation, a position jump may occur where a rack leg 408 is detected in a location that was not expected based on a tick distance and the system accordingly adjusts a position of the vehicle 102 within a time step. A position jump may further be illustrated where a control module 36A determines a first rack leg position of a first rack leg 408 in an aisle based on a first rack leg imaging module 300 and a control module 36B determine a second rack leg position of a second, opposing rack leg 408 in the aisle based on a second, opposing rack leg imaging module 300 on the vehicle 102. The position jump may be based on the difference between the first rack leg position and the second rack leg position and be made in an inches per time step increment. A position jump outside of a tolerance may be indicative of a redundancy check failure.

The position outputs may be received and compared in the control module 36A, 36B and/or the vehicle controller 502A to determine whether the generated position outputs are within a predetermined tolerance. If so, the redundancy check passes. If not, the redundancy check fails.

In block 1308, the vehicle 102 may be commanded to take an action when the vehicle 102 is outside of the one or more end of aisles and/or based on the failing of the one or more data redundancy checks. For example, such a determination that the vehicle 102 is outside of the aisle limit and/or a failing of a data redundancy check may cause the vehicle controller 502A to take an action to slow or to halt the vehicle 102. Based on a determination that the one or more redundancy checks fail, such that the redundancies do not match or do not match within a tolerance as described herein, then one or more of the control module 36, 36A, and/or 36B may send a fail message and a command to the vehicle controller 502A to take the action, such as to halt the vehicle 102.

Out of Aisle Localization

Figure 14:
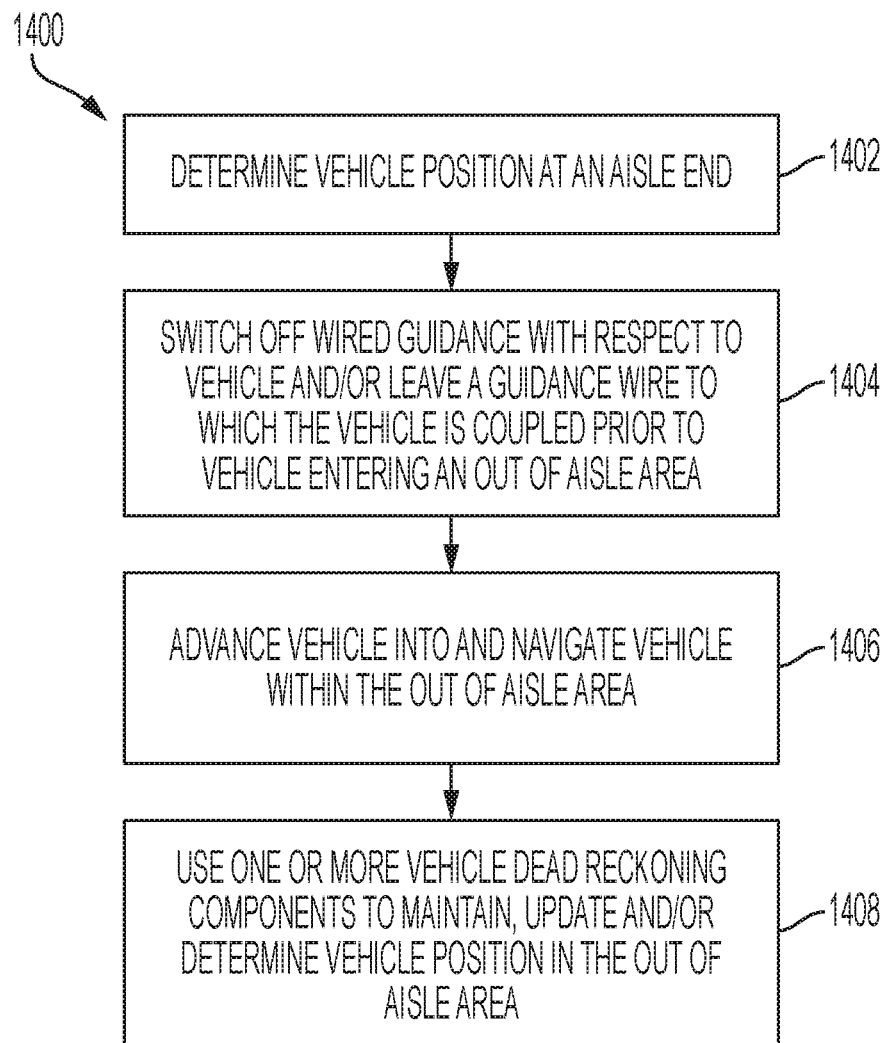
FIG. 14 depicts a flowchart overview of a method for an out of aisle dead reckoning localization continuation method, according to one or more embodiments shown and described herein.

Referring to FIG. 14, an out of aisle dead reckoning localization continuation method 1400 is shown. In an embodiment of the method 1400, a materials handling vehicle 102 comprises a camera 304, a vehicle position processor, and a drive mechanism configured to move the materials handling vehicle 102 along an inventory transit surface 106, and the camera 304 is configured to capture images comprising (i) an aisle entry identifier 302 for a racking system aisle 70' of a multilevel warehouse racking system 12, and (ii) at least a portion of a rack leg 408 positioned in the racking system aisle 70'.

In block 1402, a position of the vehicle 102 is determined at an end of an aisle as described herein, such as through use of a rack leg imaging module 300 to capture images of the rack leg identifiers 302 on rack legs 408 at aisle ends to update a position of the vehicle 102. For instance, the vehicle position processor is configured to (i) generate end-of-aisle positional data and aisle-specific rack leg spacing data from an image of an aisle entry identifier 302, as captured by the camera 304, (ii) generate an initial position of the materials handling vehicle along the inventory transit surface using the end-of-aisle positional data, and (iii) generate an expected position of the materials handling vehicle as the vehicle travels down a racking system aisle corresponding to the aisle entry identifier from the end-of-aisle positional data and the aisle-specific rack leg spacing data.

The vehicle position processor may further be configured to navigate the materials handling vehicle 102 to exit the racking system aisle 70'. In block 1404, wired guidance with respect to the vehicle 102 in the aisle is switched off and/or the vehicle leaves a guidance wire to which the vehicle 102 is coupled prior to the vehicle exiting the aisle and entering an out of aisle area of the warehouse 11, such as shown in FIG. 1B. In block 1406, the vehicle 102 is advanced into and navigated within the out of aisle area of the warehouse 11.

The vehicle position processor may further be configured to update the expected position of the materials handling vehicle 102 using a dead reckoning component of the materials handling vehicle 102 when the materials handling vehicle 102 is outside of the racking system aisle 70'. In block 1408, for instance, one or more vehicle dead reckoning components are used to maintain, update, and/or determine position of the vehicle 102 within the out of aisle area of the warehouse 11. By way of example, and not as a limitation, after wire guidance is switched off and/or the vehicle 102 leaves a guidance wire, dead reckoning such as through vehicle odometry measurements recorded and transmitted by the encoder 29 of FIG. 5 to the control module 36 may be used to maintain a position of the vehicle 102 in the warehouse 11. Further, data from the vehicle controller 502 such as the steer wheel angle and the steer wheel speed is transmitted to the control module 36 to be used with the odometry data to determine the position of the vehicle 102 in the warehouse 11.

The use of a load wheel encoder as the encoder 29 may provide for more accurate odometry data as the load wheel encoder suffers less slip than use of a drive wheel encoder that is driven by a motor. However, in embodiments, the load wheel encoder cannot be used when the steering angle of the vehicle 102 is such that the load wheel is stationary. The load wheel may reference one or more load wheels positioned near the forks of the vehicle 102 to assist with bearing a load of and navigation of the forks, for example. This angle may be, for example, −78 degrees for load wheel with respect to the vehicle 102. The use of a load wheel encoder may provide for a distance measurement though not necessarily a heading indication. Regardless of the type of the encoder 29 that is used, other dead reckoning components may be used alternatively or in addition to improve dead reckoning accuracy, saw as the yaw rate sensor 31 of FIG. 5 to provide a heading indication and/or to calibrate a heading indication and account for slip. The yaw rate sensor 31 may be a gyroscopic device configured to measure an angular velocity of the vehicle 102 around a vertical axis. An angle between a heading of the vehicle 102 and an actual movement direction of the vehicle 102 would be a slip angle related to a yaw rate of the vehicle 102. In embodiments, a camera pointing to the inventory transit surface 106 of the out of aisle area of the warehouse 11 and/or use of RFID tags may additionally or alternatively be used to provide and/or maintain dead reckoning data with respect to the vehicle 102 in the warehouse 11.

Figure 15:
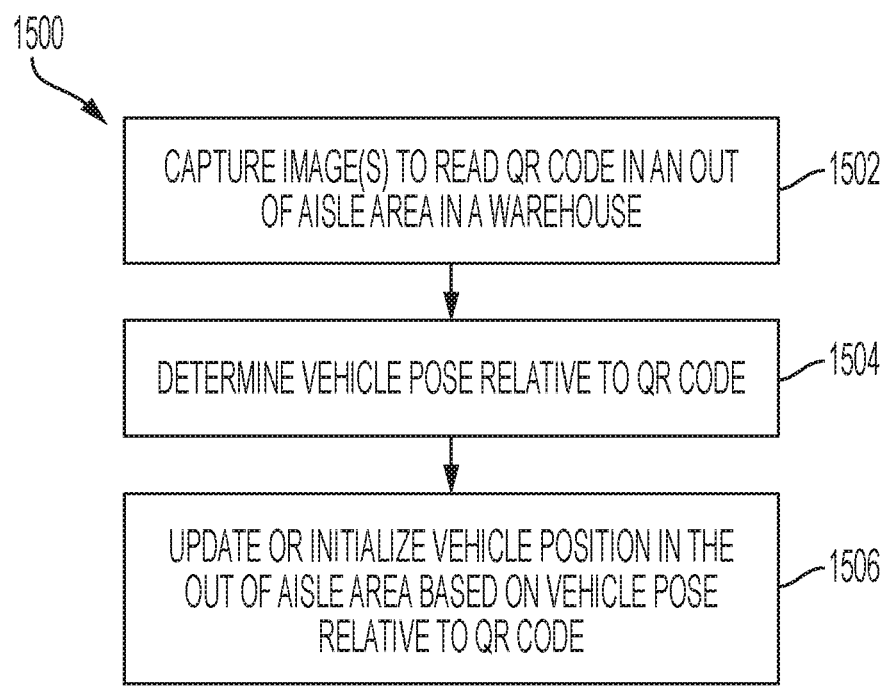
FIG. 15 depicts a flowchart overview of a method for an out of aisle identifier localization continuation method, according to one or more embodiments shown and described herein.

Referring to FIG. 15, an out of aisle identifier localization continuation method 1500 is shown. As shown in FIG. 1B, one or more out of aisle identifiers 71 may be placed in one or more out of aisle areas of the warehouse 11. The method 1500 may be used in addition to or in alternative of the method 1400. Further, one or more steps of methods 1400 and 1500 may be used in addition to or as an alternative of the steps of methods 600, 1100, 1200, and/or 1300 described herein. Referring to the method 1500, a materials handling vehicle 102 used may comprise a camera 304, a vehicle position processor, and a drive mechanism configured to move the materials handling vehicle 102 along an inventory transit surface 106, and the camera 304 is configured to capture images comprising an aisle exit identifier 302 for a racking system aisle 70' of a multilevel warehouse racking system 12.

In an embodiment, end-of-aisle positional data is generated from an image of an aisle exit identifier 302, as captured by the camera 304, a vehicle pose of the materials handling vehicle 102 is generated relative to the aisle exit identifier 302 using the end-of-aisle positional data, and an inventory transit surface position is generated of the materials handling vehicle 102 along the inventory transit surface 106 using the end-of-aisle positional data and the vehicle pose. The materials handling vehicle 102 is navigated to exit the racking system aisle 70', and the inventory transit surface position of the materials handling vehicle 102 is updated using a tag identifier component of the materials handling vehicle when the materials handling vehicle is outside of the racking system aisle. Out-of-aisle positional data may be generated from a tag identifier 71, as received by the tag identifier component, and the vehicle pose of the materials handling vehicle may be updated relative to the tag identifier 71 using the out-of-aisle positional data.

In block 1502, for instance, one or more images are captured by the rack leg imaging module 300 on the vehicle 102 as described herein to read and process the one or more out of aisle identifiers 71 in the out of aisle areas of the warehouse 11. The rack leg imaging module 300 captures and processes images of one or more out of aisle identifiers 71 similar to how the one or more rack leg identifiers 302 are captured and processed by the rack leg imaging module 300 on the vehicle 102 as described herein. Thus, in block 1502, a series of images may be captured of a QR code as an out of aisle tag identifier 71 in an out of aisle area of the warehouse 11. Such QR codes may be placed as the one or more out of aisle identifiers 71 in out of aisle areas of the warehouse 11 within a height range sufficient to be read by the rack leg imaging module 300 of the vehicle 102. When the vehicle 102 including the rack leg imaging module 300 is navigating an out of aisle area of the warehouse, the vehicle 102 may be maintaining a position estimate through dead reckoning as determined through the method 1500 of FIG. 1. Use of the method 1500 through reading of the QR code in the out of aisle area through the rack leg imaging module 300 as described herein operates to calibrate and correct the position estimate of the vehicle 102 in the out of aisle area of the warehouse 11.

In block 1504, a pose of the vehicle 102 relative to the out of aisle tag identifier 71 is then determined based on the captured images of block 1502 and by, for example, the control module 36. For example, multiple observations of the same out of aisle tag identifier 71 (e.g., QR code) in the out of aisle area permits a distance and heading of the vehicle 102 relative to the out of aisle tag identifier 71 to be determined. The multiple observations may permit image capture of different angles of the camera 304 of the rack leg imaging module 300 of the vehicle 102 with respect to the out of aisle tag identifier 71 to be captured. The multiple image captures at different angles with respect to the out of aisle tag identifier 71 are used to determine a position of the camera 304 relative to the out of aisle tag identifier 71, and thus the position of the vehicle 102 may be determined based on the position of the camera 304 relative to the out of aisle tag identifier 71.

In embodiments, one or more sensors on the vehicle 102 may determine a distance to the out of aisle tag identifier 71 and/or a wall, such as through use of a laser on the vehicle 102 and a reflector on the out of aisle tag identifier 71 and/or the wall. Thus, even when the vehicle 102 is not fixed on a guidewire, a distance measurement of the vehicle with respect to a component or structure in the warehouse 11 may be determined and used to generate the position of the vehicle 102.

Thus, out of aisle positioning error may be constrained over a large area including one or more out of aisle areas of the warehouse 11. In block 1506, the position of the vehicle 102 in the out of aisle area of the warehouse 11 is then updated or initialized based on the pose of the vehicle 102 relative to the QR code as the out of aisle tag identifier 71 as determined in block 1504. In embodiments, such as when the vehicle 102 is not positioned on guidance wire in the out of aisle area, an estimated previous position of the vehicle 102 should be maintained to be updated by the determined position of the vehicle 102 based on the position of the camera 304 relative to the out of aisle tag identifier 71. Further, such out of aisle localization of the position of the vehicle 102 in the out of aisle area of the warehouse 11 may enable and be provided as input for vehicle alert systems, such as alerts the vehicle 102 is entering a restricted zone, a speed limited zone, or the like.

It is contemplated and within the scope of this disclosure that the methods described herein, such as those set forth in FIGS. 6 and 11-14, or one or more steps thereof, may be performed in addition to or alternative of one other in one or more combinations.

For the purposes of describing and defining the present disclosure, it is noted that reference herein to a variable being a "function" of or "based on" a parameter or another variable is not intended to denote that the variable is exclusively a function of the listed parameter or variable. Rather, reference herein to a variable that is a "function" of or "based on" a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present disclosure it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Reference herein to subject matter that is generated, or determined, "from" or "using" a particular input should not be read to imply that the subject matter is generated or determined using only the particular input. These transitional terms, i.e., "from" and "using" are open-ended terms. Accordingly, the use of phrases like "generated from," "generated using," "determined from," "determined using," "updated using," etc., are open-ended phrases that contemplate the use of additional information, data, or other input, to further enhance the generation or determination. For example, the vehicle position processor of the present disclosure is recited herein to generate end-of-aisle positional data from an image of an aisle entry identifier, but this recitation should not be read to exclude the use of other information, like odometry data or predetermined positional data, to help generate end-of-aisle positional data.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A materials handling vehicle comprising a camera, a mast assembly, a mast assembly control unit, a fork carriage assembly, a vehicle position processor, and a drive mechanism configured to move the materials handling vehicle along an inventory transit surface of a warehouse, wherein:

the mast assembly and the mast assembly control unit are configured to move the fork carriage assembly along a vertical lift axis;

the camera is secured to the fork carriage assembly and is configured to capture
  (i) a forks down image of at least a portion of a rack leg positioned in a racking system aisle of a multilevel warehouse racking system, and
  (ii) a forks-up image of at least a portion of a rack leg positioned in a racking system aisle of the multilevel warehouse racking system; and the vehicle position processor is configured to
  generate a forks-down coordinate X1 of the camera along a horizontal axis from the forks-down image of the rack leg,
  generate a forks-up coordinate X2 of the camera along a horizontal axis from a forks-up image of the rack leg captured with the fork carriage assembly at a lift height H1,
  determine a mast sway offset as a difference between the forks-down coordinate X1 and the forks-up coordinate X2, and
  determine a horizontally advanced position of the materials handling vehicle with the fork carriage assembly at the lift height H1 using the mast sway offset and a subsequently captured forks-up image of at least a portion of a rack leg positioned in the racking system aisle.

2. The materials handling vehicle of claim 1, wherein:
the camera is further configured to capture an image of an aisle entry identifier in the multilevel warehouse racking system; and
the vehicle position processor is further configured to:
  generate aisle-specific rack leg spacing data from an image of an aisle entry identifier, as captured by the camera, and
  determine the horizontally advanced position of the materials handling vehicle with the fork carriage assembly at the lift height H1 using the aisle-specific rack leg spacing data in addition to the mast sway offset and the subsequently captured forks-up image.

3. The materials handling vehicle of claim 1, wherein:
the camera is further configured to capture an image of an aisle entry identifier in the multilevel warehouse racking system;
the vehicle position processor is further configured to:
  generate end-of-aisle positional data and aisle-specific rack leg spacing data from an image of an aisle entry identifier, as captured by the camera,
  generate an initial position of the materials handling vehicle along the inventory transit surface using the end-of-aisle positional data,
  generate an expected position of the materials handling vehicle as the vehicle travels down a racking system aisle corresponding to the aisle entry identifier from the end-of-aisle positional data, the aisle-specific rack leg spacing data, and a forks-down image of at least a portion of a rack leg positioned in the racking system aisle, and
  update the expected position of the materials handling vehicle as the vehicle travels down the racking system aisle using the mast sway offset and the subsequently captured forks-up image of at least a portion of a rack leg positioned in the racking system aisle.

4. The materials handling vehicle of claim 3, wherein the aisle entry identifier is disposed on an end rack leg of the racking system aisle.

5. The materials handling vehicle of claim 1, wherein the camera is secured directly or indirectly to the fork carriage assembly.

6. The materials handling vehicle of claim 1, wherein:
the camera is further configured to capture an image of an aisle end identifier in the multilevel warehouse racking system;
the vehicle position processor is further configured to:
  generate end-of-aisle limit data comprising an end-of-aisle limit from an image of an aisle end identifier, as captured by the camera,
  determine whether the materials handling vehicle exceeds the end-of-aisle limit,
  transmit a limit-based command to the drive mechanism of the materials handling vehicle when an operating state of the materials handling vehicle exceeds the end-of-aisle limit,
  initiate a vehicle action based on the limit-based command, the vehicle action configured to modify operation of the materials handling vehicle to a modified operating state within the end-of-aisle limit, and
  navigate the materials handling vehicle to exit the racking system aisle in the modified operating state.

7. The materials handling vehicle of claim 6, wherein the aisle end identifier is disposed on an aisle end rack leg.

8. The materials handling vehicle of claim 6, wherein the end-of-aisle limit comprises a speed limit, a lift height limit, an acceleration limit, a deceleration limit, a lift acceleration limit, a lift deceleration limit, or combinations thereof.

9. The materials handling vehicle of claim 6, wherein the vehicle position processor is configured to navigate the materials handling vehicle outside of the racking system aisle in the modified operating state, in an additional operating state that is within or outside of the end-of-aisle limit, or in a combination of operating states selected therefrom.

10. The materials handling vehicle of claim 1, wherein:
the camera is further configured to capture an image of an aisle entry identifier in the multilevel warehouse racking system;
the vehicle position processor is further configured to:
  generate end-of-aisle limit data comprising an end-of-aisle limit, end-of-aisle positional data, and aisle-specific rack leg spacing data from an image of an aisle entry identifier, as captured by the camera,
  generate an initial position of the materials handling vehicle along the inventory transit surface using the end-of-aisle positional data,
  generate an expected position of the materials handling vehicle as the vehicle travels down a racking system aisle corresponding to the aisle entry identifier from the end-of-aisle positional data, the aisle-specific rack leg spacing data, and the horizontally advanced position,
  determine whether the operating state of the materials handling vehicle exceeds the end-of-aisle limit when the expected position of the materials handling vehicle corresponds to an end of the racking system aisle,
  transmit a limit-based command to the drive mechanism of the materials handling vehicle when the operating state of the materials handling vehicle exceeds the end-of-aisle limit,
  initiate a vehicle action based on the limit-based command, the vehicle action configured to modify operation of the materials handling vehicle to a modified operating state within the end-of-aisle limit, and
navigate the materials handling vehicle to exit the racking system aisle in the modified operating state.

11. The materials handling vehicle of claim 10, wherein the vehicle position processor is further configured to generate the expected position of the materials handling vehicle from an image of at least a portion of a rack leg positioned in the racking system aisle.

12. The materials handling vehicle of claim 1, wherein:
the camera is configured to capture images comprising an aisle entry identifier for a racking system aisle of the multilevel warehouse racking system; and
the vehicle position processor is configured to
generate end-of-aisle positional data and aisle-specific rack leg spacing data from an image of an aisle entry identifier, as captured by the camera,
generate an initial position of the materials handling vehicle along the inventory transit surface using the end-of-aisle positional data,
generate an expected position of the materials handling vehicle as the vehicle travels down a racking system aisle corresponding to the aisle entry identifier from the end-of-aisle positional data, the aisle-specific rack leg spacing data, and the horizontally advanced position,
navigate the materials handling vehicle to exit the racking system aisle, and
update the expected position of the materials handling vehicle using a dead reckoning component of the materials handling vehicle when the materials handling vehicle is outside of the racking system aisle.

13. The materials handling vehicle of claim 1, wherein:
the camera is configured to capture images comprising an aisle exit identifier for a racking system aisle of the multilevel warehouse racking system; and
the vehicle position processor is configured to
generate end-of-aisle positional data from an image of an aisle exit identifier, as captured by the camera,
generate a vehicle pose of the materials handling vehicle relative to the aisle exit identifier using the end-of-aisle positional data,
generate an inventory transit surface position of the materials handling vehicle along the inventory transit surface using the end-of-aisle positional data, the vehicle pose, and the horizontally advanced position,
navigate the materials handling vehicle to exit the racking system aisle, and
update the inventory transit surface position of the materials handling vehicle using a tag identifier component of the materials handling vehicle when the materials handling vehicle is outside of the racking system aisle.

14. The materials handling vehicle of claim 13, wherein the vehicle position processor is configured to
generate out-of-aisle positional data from a tag identifier, as received by the tag identifier component, and
update the vehicle pose of the materials handling vehicle relative to the tag identifier using the out-of-aisle positional data.

15. A method of localizing a materials handling vehicle comprising a camera, a mast assembly, a mast assembly control unit, a fork carriage assembly, a vehicle position processor, and a drive mechanism configured to move the materials handling vehicle along an inventory transit surface of a warehouse, wherein:

the mast assembly and the mast assembly control unit are configured to move the fork carriage assembly along a vertical lift axis;
the camera is secured to the fork carriage assembly and is configured to capture
(i) a forks down image of at least a portion of a rack leg positioned in a racking system aisle of a multilevel warehouse racking system, and
(ii) a forks-up image of at least a portion of a rack leg positioned in a racking system aisle of the multilevel warehouse racking system; and
the method comprising, via the vehicle position processor,
generating a forks-down coordinate X1 of the camera along a horizontal axis from the forks-down image of the rack leg,
generating a forks-up coordinate X2 of the camera along a horizontal axis from a forks-up image of the rack leg captured with the fork carriage assembly at a lift height H1,
determining a mast sway offset as a difference between the forks-down coordinate X1 and the forks-up coordinate X2, and
determining a horizontally advanced position of the materials handling vehicle with the fork carriage assembly at the lift height H1 using the mast sway offset and a subsequently captured forks-up image of at least a portion of a rack leg positioned in the racking system aisle.

16. The method of claim 15, wherein the camera is further configured to capture an image of an aisle end identifier in the multilevel warehouse racking system, the method further comprising:
generating end-of-aisle limit data comprising an end-of-aisle limit from an image of an aisle end identifier, as captured by the camera,
determining whether the materials handling vehicle exceeds the end-of-aisle limit,
transmitting a limit-based command to the drive mechanism of the materials handling vehicle when an operating state of the materials handling vehicle exceeds the end-of-aisle limit,
initiating a vehicle action based on the limit-based command, the vehicle action configured to modify operation of the materials handling vehicle to a modified operating state within the end-of-aisle limit, and
navigating the materials handling vehicle to exit the racking system aisle in the modified operating state.

17. The method of claim 15, wherein the camera is further configured to capture an image of an aisle entry identifier in the multilevel warehouse racking system, the method further comprising:
generating end-of-aisle limit data comprising an end-of-aisle limit, end-of-aisle positional data, and aisle-specific rack leg spacing data from an image of an aisle entry identifier, as captured by the camera,
generating an initial position of the materials handling vehicle along the inventory transit surface using the end-of-aisle positional data,
generating an expected position of the materials handling vehicle as the vehicle travels down a racking system aisle corresponding to the aisle entry identifier from the end-of-aisle positional data, the aisle-specific rack leg spacing data, and the horizontally advanced position,
determining whether the operating state of the materials handling vehicle exceeds the end-of-aisle limit when the expected position of the materials handling vehicle corresponds to an end of the racking system aisle, transmitting a limit-based command to the drive mechanism of the materials handling vehicle when the operating state of the materials handling vehicle exceeds the end-of-aisle limit, and initiating a vehicle action based on the limit-based command, the vehicle action configured to modify operation of the materials handling vehicle to a modified operating state within the end-of-aisle limit, and navigating the materials handling vehicle to exit the racking system aisle in the modified operating state.

18. The method of claim 15, wherein the camera is configured to capture images comprising an aisle entry identifier for a racking system aisle of the multilevel warehouse racking system, the method further comprising:

generating end-of-aisle positional data and aisle-specific rack leg spacing data from an image of an aisle entry identifier, as captured by the camera, generating an initial position of the materials handling vehicle along the inventory transit surface using the end-of-aisle positional data, generating an expected position of the materials handling vehicle as the vehicle travels down a racking system aisle corresponding to the aisle entry identifier from the end-of-aisle positional data, the aisle-specific rack leg spacing data, and the horizontally advanced position, navigating the materials handling vehicle to exit the racking system aisle, and updating the expected position of the materials handling vehicle using a dead reckoning component of the materials handling vehicle when the materials handling vehicle is outside of the racking system aisle.

19. The method of claim 15, wherein the camera is configured to capture images comprising an aisle exit identifier for a racking system aisle of the multilevel warehouse racking system, the method further comprising:

generating end-of-aisle positional data from an image of an aisle exit identifier, as captured by the camera, generating a vehicle pose of the materials handling vehicle relative to the aisle exit identifier using the end-of-aisle positional data, generating an inventory transit surface position of the materials handling vehicle along the inventory transit surface using the end-of-aisle positional data, the vehicle pose, and the horizontally advanced position, navigating the materials handing vehicle to exit the racking system aisle, and updating the inventory transit surface position of the materials handling vehicle using a tag identifier component of the materials handling vehicle when the materials handling vehicle is outside of the racking system aisle.

20. The method of claim 19, further comprising:

generating out-of-aisle positional data from a tag identifier, as received by the tag identifier component, and updating the vehicle pose of the materials handling vehicle relative to the tag identifier using the out-of-aisle positional data.

* * * * *